(12) United States Patent
Hao et al.

(10) Patent No.: US 12,641,600 B2
(45) Date of Patent: May 26, 2026

(54) METHODS, DEVICES, AND SYSTEMS FOR RESOLVING DIRECTIONAL CONFLICT IN SUB-BAND FULL DUPLEX SYSTEM

(71) Applicant: ZTE Corporation, Shenzhen (CN)

(72) Inventors: Peng Hao, Shenzhen (CN); Wei Gou, Shenzhen (CN); Jing Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 254 days.

(21) Appl. No.: 18/513,965

(22) Filed: Nov. 20, 2023

(65) Prior Publication Data

US 2024/0089960 A1 Mar. 14, 2024

Related U.S. Application Data

(63) Continuation of application No. PCT/CN2022/077123, filed on Feb. 21, 2022.

(51) Int. Cl.
*H04W 72/1268* (2023.01)
*H04W 72/0446* (2023.01)
(Continued)

(52) U.S. Cl.
CPC ... *H04W 72/1268* (2013.01); *H04W 72/0446* (2013.01); *H04W 72/0453* (2013.01); *H04W 72/566* (2023.01)

(58) Field of Classification Search
CPC ......... H04W 72/0453; H04W 72/0446; H04W 72/1268; H04W 72/566
See application file for complete search history.

(56) References Cited

U.S. PATENT DOCUMENTS

| | | | |
|---|---|---|---|
| 2021/0306824 A1 | 9/2021 | Li et al. | |
| 2021/0315011 A1 | 10/2021 | Zhou et al. | |

(Continued)

FOREIGN PATENT DOCUMENTS

| | | | |
|---|---|---|---|
| CN | 111373829 A | 7/2020 | |
| CN | 112714495 A | 4/2021 | |
| CN | 113661668 A | 11/2021 | |
| WO | WO 2021155502 A1 | 8/2021 | |
| WO | WO 2021228140 A1 | 11/2021 | |

OTHER PUBLICATIONS

Extended European Search Report regarding EP 22 92 6524 dated Jun. 27, 2024, 8 pages.

(Continued)

*Primary Examiner* — Sam Bhattacharya
(74) *Attorney, Agent, or Firm* — Crowell & Moring LLP

(57) ABSTRACT

The present disclosure describes methods, system, and devices for resolving directional conflicts in a sub-band full duplex (SBFD) telecommunication system. The method includes obtaining a first communication occasion and a second communication occasion configured or scheduled in opposite directions to overlap in a time domain or with a gap in the time domain less than a threshold; determining whether to cancel at least a portion of the first communication occasion or to cancel at least a portion of the second communication occasion; in response to determining to cancel at least the portion of the second communication occasion, canceling at least the portion of the second communication occasion and performing the first communication occasion; and in response to determining to cancel at least the portion of the first communication occasion, canceling at least the portion of the first communication occasion and performing the second communication occasion.

13 Claims, 16 Drawing Sheets

400 obtaining, by a user equipment (UE), a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the UE and a base station in opposite directions 410 determining, by the UE, whether to cancel at least a portion of the first communication occasion or to cancel at least a portion of the second communication occasion based on first information of the first communication occasion and second information of the second communication occasion; 420 in response to determining to cancel at least the portion of the second communication occasion, canceling, by the UE, at least the portion of the second communication occasion and performing the first communication occasion; 430 in response to determining to cancel at least the portion of the first communication occasion, canceling, by the UE, at least the portion of the first communication occasion and performing the second communication occasion 440

(51) Int. Cl.
 *H04W 72/0453* (2023.01)
 *H04W 72/566* (2023.01)

(56) References Cited

U.S. PATENT DOCUMENTS

2021/0391963 A1 12/2021 Abdelghaffar
2022/0053527 A1 2/2022 Abotabl et al.

OTHER PUBLICATIONS

Japanese Office Action with English translation of the Office Action regarding Patent Application No. 2023-571883 dated Nov. 25, 2024, 13 pages.

International Search Report and Written Opinion regarding PCT/CN2022/077123 dated Oct. 25, 2022, 7 pages.
Ericsson, "R2-133300 Realization of D2D broadcast communication," *3GPP tsg_ran\WG2_RL2*, Sep. 28, 2013, 6 pages.
Japanese-language Office Action with machine translation issued in Application No. 2023-571883 dated Apr. 8, 2025 (5 pages).
Korean Office Action with English summary of Office action issued in Korean Patent Application No. 10-2023-7041090 dated Feb. 24, 2026, (11 pages).
Intel Corporation, "Support of HD-FDD for RedCap," 3GPP TSG RAN WG1 #106bis-E, R1-2109618, eMeeting Oct. 11-19, 2021, 12 pages.
3GPP, TS38.212 v16.8.0, Technical Specification Group Radio Access Network, NR, "Multiplexing and channel coding," Release 16, Dec. 2021, 153 pages.
Chinese-language Office Action, with machine translation, issued in Application No. 202280034918.0 dated Aug. 26, 2025, (18 pages).

150

160

400 obtaining, by a user equipment (UE), a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the UE and a base station in opposite directions          410 determining, by the UE, whether to cancel at least a portion of the first communication occasion or to cancel at least a portion of the second communication occasion based on first information of the first communication occasion and second information of the second communication occasion;          420 in response to determining to cancel at least the portion of the second communication occasion, canceling, by the UE, at least the portion of the second communication occasion and performing the first communication occasion;          430 in response to determining to cancel at least the portion of the first communication occasion, canceling, by the UE, at least the portion of the first communication occasion and performing the second communication occasion          440

FIG. 4A

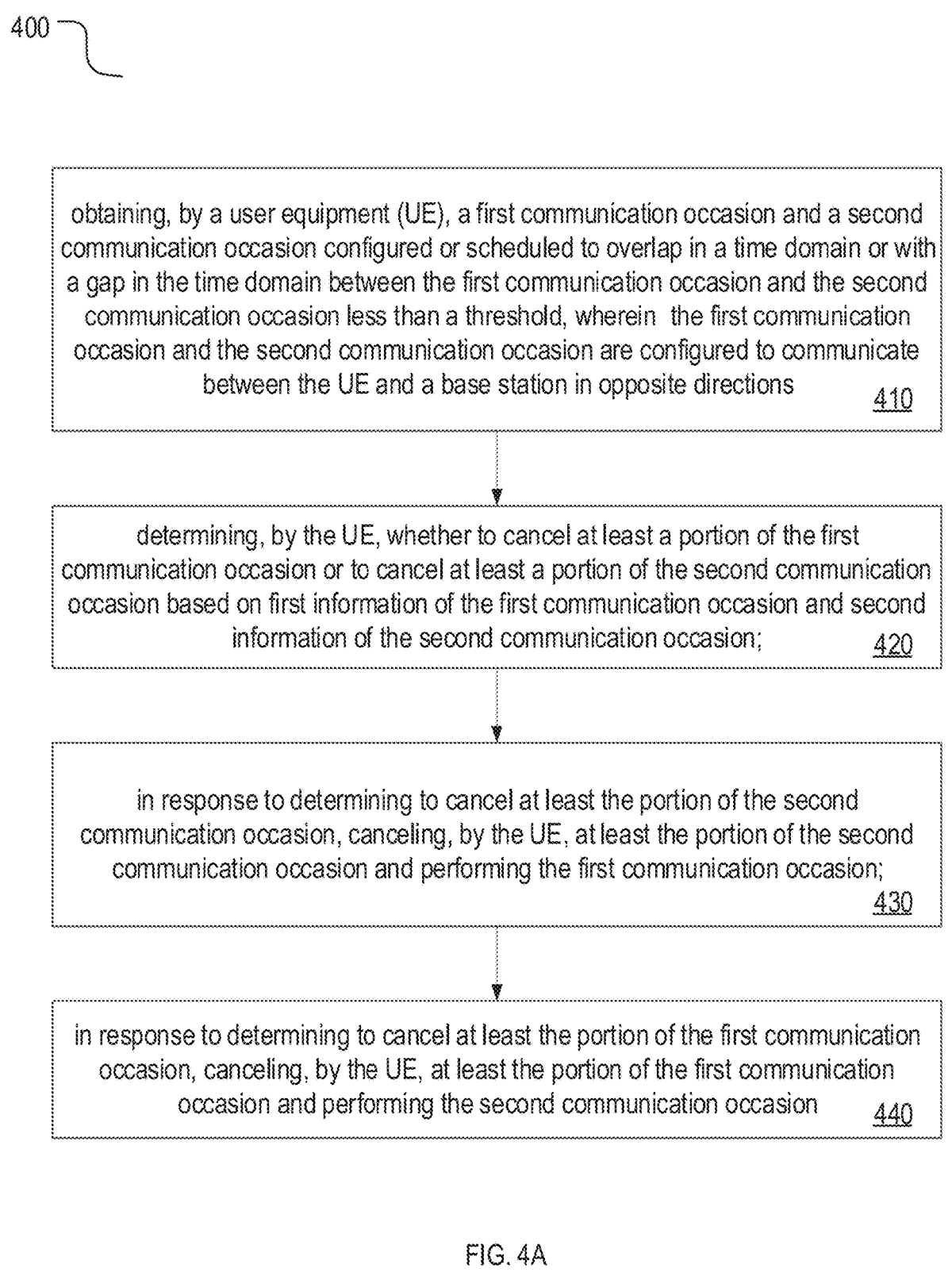

450 scheduling, by a base station, a first communication occasion and a second communication occasion to overlap in a time domain or with a gap in the time domain between the first communication occasion and the second communication occasion less than a threshold, wherein     the first communication occasion and the second communication occasion are configured for a user equipment (UE) for communication between the UE and the base station in opposite directions

460 in response to determining to cancel at least a portion of the second communication occasion, performing, by the base station, the first communication occasion

470 in response to determining to cancel at least the portion of the first communication occasion, performing, by the base station, the second communication occasion

METHODS, DEVICES, AND SYSTEMS FOR RESOLVING DIRECTIONAL CONFLICT IN SUB-BAND FULL DUPLEX SYSTEM

CROSS-REFERENCE TO RELATED APPLICATION

This application is a continuation application of PCT International Patent Application No. PCT/CN2022/077123, filed with the China National Intellectual Property Administration, PRC on Feb. 21, 2022, which is herein incorporated by reference in its entirety.

TECHNICAL FIELD

The present disclosure is directed generally to wireless communications. Particularly, the present disclosure relates to methods, devices, and systems for resolving directional conflicts in a sub-band full duplex (SBFD) telecommunication system.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

With the rapid evolution of cellular mobile communication systems, sub-band full duplex (SBFD) technology may be an important feature to further improve efficiency and performance of the new generation mobile communication technology. The sub-band full duplex technology may enable sub-band full duplex with different frequency resources. The SBFD may boost the coverage and reduce latency of communication as downlink (DL) and/or uplink (UL) resources is available at any time through proper configuration although they are not accessible at same time. There are problems/issues associated with implementing SBFD in the current technology. One of the problems/issues may include directional conflict, in which different cells are configured or scheduled with channels and/or signals with different link direction at a certain occasion.

The present disclosure may address at least one of issues/problems associated with the existing system, particularly solving the issues/problems related to directional conflict, and describes various embodiments, thus improving the efficiency and/or performance of the wireless communication.

SUMMARY

This document relates to methods, systems, and devices for wireless communication, and more specifically, for resolving directional conflicts in a sub-band full duplex (SBFD) telecommunication system. The various embodiments in the present disclosure may enable handling of directional conflict in SBFD system, which can reduce gNB's implementation complexity, increase the resource utilization efficiency and boost latency performance of ultra-reliable low latency communication (URLLC) traffic.

In one embodiment, the present disclosure describes a method for wireless communication. The method includes obtaining, by a user equipment (UE), a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the UE and a base station in opposite directions; determining, by the UE, whether to cancel at least a portion of the first communication occasion or to cancel at least a portion of the second communication occasion based on first information of the first communication occasion and second information of the second communication occasion; in response to determining to cancel at least the portion of the second communication occasion, canceling, by the UE, at least the portion of the second communication occasion and performing the first communication occasion; and in response to determining to cancel at least the portion of the first communication occasion, canceling, by the UE, at least the portion of the first communication occasion and performing the second communication occasion.

In one embodiment, the present disclosure describes a method for wireless communication. The method includes scheduling, by a base station, a first communication occasion and a second communication occasion to overlap in a time domain or with a gap in the time domain between the first communication occasion and the second communication occasion less than a threshold, wherein the first communication occasion and the second communication occasion are configured for a user equipment (UE) for communication between the UE and the base station in opposite directions; in response to determining to cancel at least a portion of the second communication occasion, performing, by the base station, the first communication occasion; and in response to determining to cancel at least the portion of the first communication occasion, performing, by the base station, the second communication occasion.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 4B shows a flow diagram of another method for wireless communication.

DETAILED DESCRIPTION

Figure 1A:
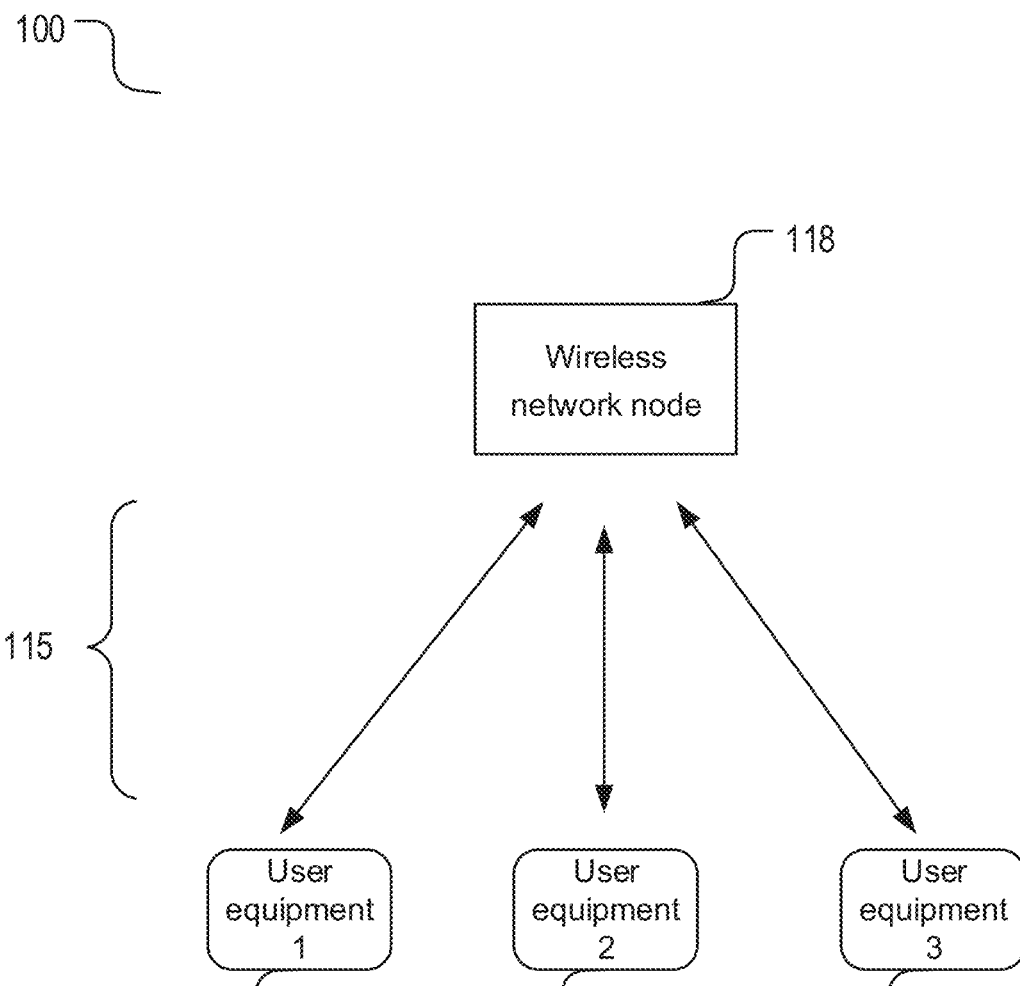
FIG. 1A shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for resolving directional conflicts in a sub-band full duplex (SBFD) telecommunication system.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

With the rapid evolution of cellular mobile communication systems, more and more cells will be operated at higher frequencies. With the rapid evolution of cellular mobile communication systems, sub-band full duplex (SBFD) technology may be an important feature to further improve efficiency and performance of the new generation mobile communication technology. The sub-band full duplex technology may enable sub-band full duplex with different frequency resources. In some implementations, half duplex mode, i.e., only transmitting or receiving at a certain time, may be utilized in order to avoid increasing implementation complexity.

In some implementations, the SBFD system may be implemented differently from a conventional frequency division duplex (FDD) system, wherein there is no specific frequency resource dedicated to downlink and/or uplink. In some other implementations, the SBFD system may be implemented similarly as a time division duplex (TDD) system to a certain extent, wherein one frequency resource may be used for downlink transmission, uplink transmission or both downlink and uplink transmission in TDD manner. In some other implementations, differently from FDD/TDD systems, different frequency resources for the SBFD system may have different downlink/uplink (DL/UL) slot configuration and/or may be in the same frequency band. The SBFD system may boost the coverage and/or reduce latency of communication as DL and/or UL resources is available at any time through proper configuration, although, under some circumstances, they may not be accessible at same time.

FIG. 1A shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115 for downlink/uplink communication. For example, a first UE 110 may wirelessly communicate with a wireless network node 118 via a channel including a plurality of radio channels during a certain period of time. The network base station 118 may send high layer signaling to the UE 110. The high layer signaling may include configuration information for communication between the UE and the base station. In one implementation, the high layer signaling may include a radio resource control (RRC) message.

Figure 1B:
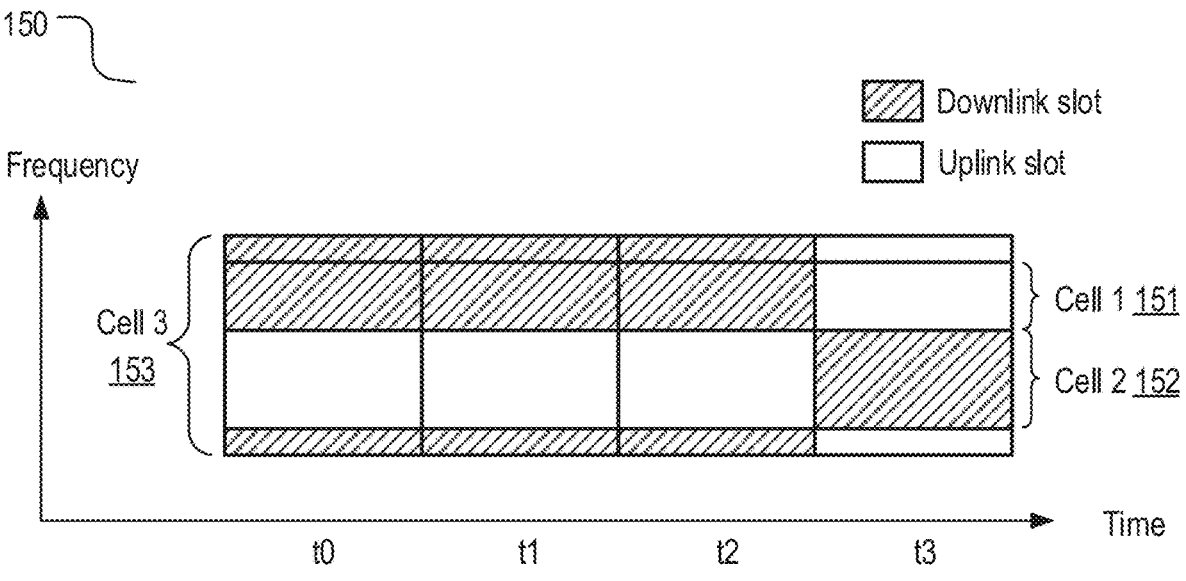
FIG. 1B shows an example of a cell configuration for a network node (e.g., a base station).

In some embodiments, an SBFD system may regard different 'sub-band' as different cells, i.e., carrier-aggregation (CA) based SBFD (CA-SBFD). FIG. 1B shows a cell configuration 150 at a base station (e.g., gNB), wherein the gNB may work on cell 1 (151, cell1) and cell 2 (152, cell2) simultaneously or may work on cell1 and cell 3 (153, cell3) simultaneously for CA-SBFD, and a UE may be configured with either two cells or one cell. In some other implementations with in-band full duplex being supported at the gNB (i.e., the same time/frequency domain resource may be used for both downlink and uplink at the same time), the gNB may work on cell1, cell2, and cell3 at the same time. As shown in FIG. 1B, the cell 3 overlaps with the cell 1 and the cell 2 in the frequency domain; and/or the cell 1 and the cell 2 do not overlap in the frequency domain.

In some implementations, a UE may be configured with either one cell or two cells if the two cells share the same DL/UL configuration (via either DL/UL configuration signaling or scheduling signaling).

In some other implementations, a UE may be configured with two cells with different DL/UL configuration to exploit benefits of SBFD (e.g., latency reduction, coverage enhancement). Due to the limited self-interference (i.e., UL-to-DL interference) mitigation capability at a UE side, the UE may not work in two cells at the same time in the occasion where the two cells have different link direction, i.e., UE may not transmit and receive in two cells respectively at the same time, otherwise strong self-interference may block the reception of DL signal.

Figure 1C:
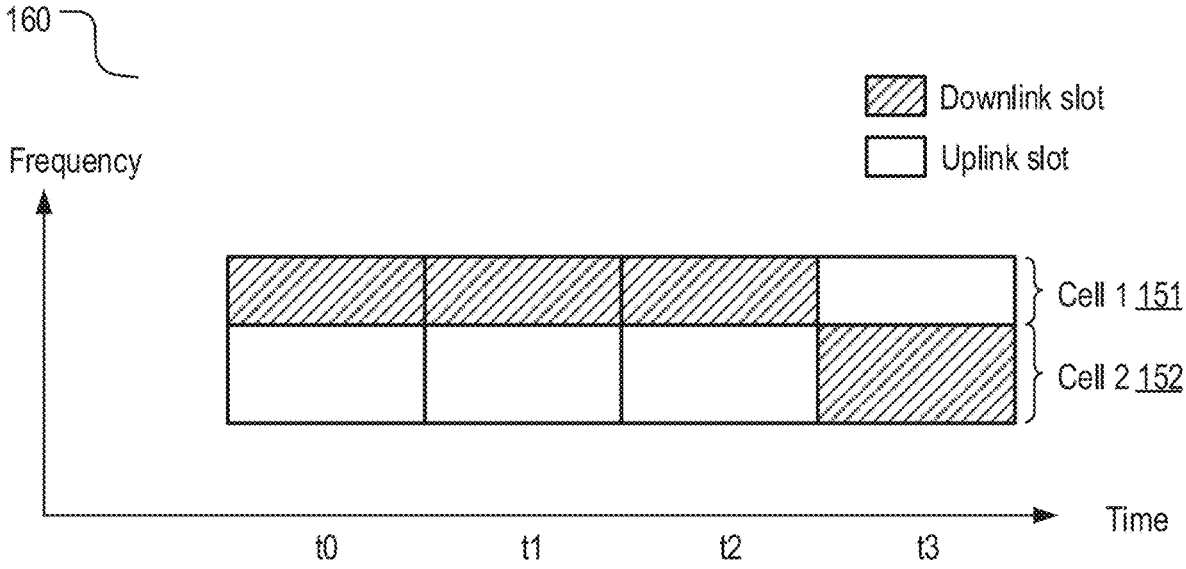
FIG. 1C shows an example of a cell configuration for a user equipment.
Figure 1D:
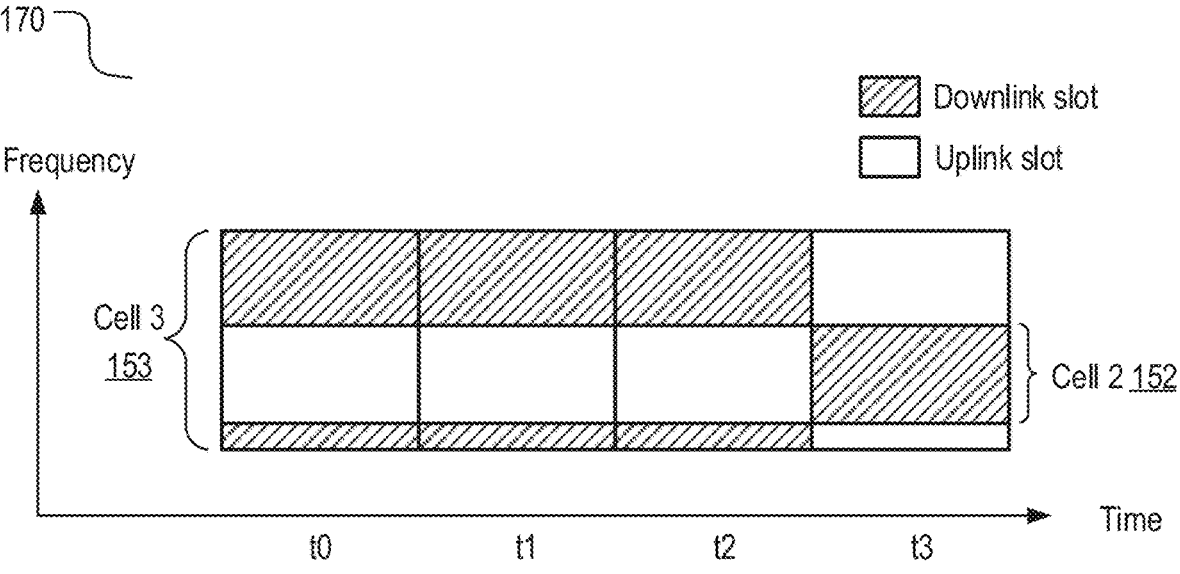
FIG. 1D shows an example of a cell configuration for another user equipment.

FIG. 1C shows a cell configuration 160 for a first UE (UE1), wherein the UE1 is configured with two cells, i.e., cell1 and cell2 which are not overlapping with each other. FIG. 1C shows the cell1 and cell2 are contiguous in the frequency domain, but in some implementations, the cell1 and cell2 may be either contiguous or non-contiguous in a frequency band. FIG. 1D shows a cell configuration 170 for a second UE (UE2), wherein the UE2 is configured with 2 cells, i.e., cell2 and cell3 which are fully or partially overlapping. The UE2 may enjoy a higher DL throughput than the UE1 considering that the cell3 is configured with larger bandwidth. In some implementations, for CA-SBFD in a carrier with small bandwidth (e.g., 5 MHz bandwidth), supporting of cell overlapping in the frequency domain may be important and desirable, considering that the small bandwidth may make dividing the carrier into smaller bandwidth impossible as sufficient frequency source may be needed for synchronization signal block (SSB).

In some other implementations, CA-SBFD may work in either one contiguous carrier or several non-contiguous carriers in a band, and/or may unify the above descriptions of these two scenarios.

When different cells are configured or scheduled with channels and/or signals with different link direction at a certain occasion (e.g., with different frequency resources/cells in the frequency domain and at the same time in the time domain), directional conflict may arise under certain circumstances. The occasion of directional conflict may also include that, although the two communication occasions may not overlap entirely in the time domain, the two communication occasions are configured/scheduled with a gap in the time domain between the two communication occasions less than a threshold. For example but not limited to, the threshold may be a few millisecond (ms) (e.g., 1 ms or 0.5 ms).

The present disclosure describes various embodiment for resolving/handling directional conflicts in SBFD or CA-SBFD systems under certain circumstances. Without directional conflict handling mechanism, a gNB may have to avoid directional conflict via configuration and/or scheduling; this approach is undesirable since it may dramatically increase gNB's implementation complexity and reduce resource utilization efficiency. For example, even the resource in one cell is not used, the resource in another cell can't be used if the resources in two cells overlap with each other in time domain. Meanwhile, high priority traffic may not be efficiently prioritized when directional conflict is not allowed, which degrade the latency performance of ultra-reliable low latency communication (URLLC) traffic.

Figure 2:
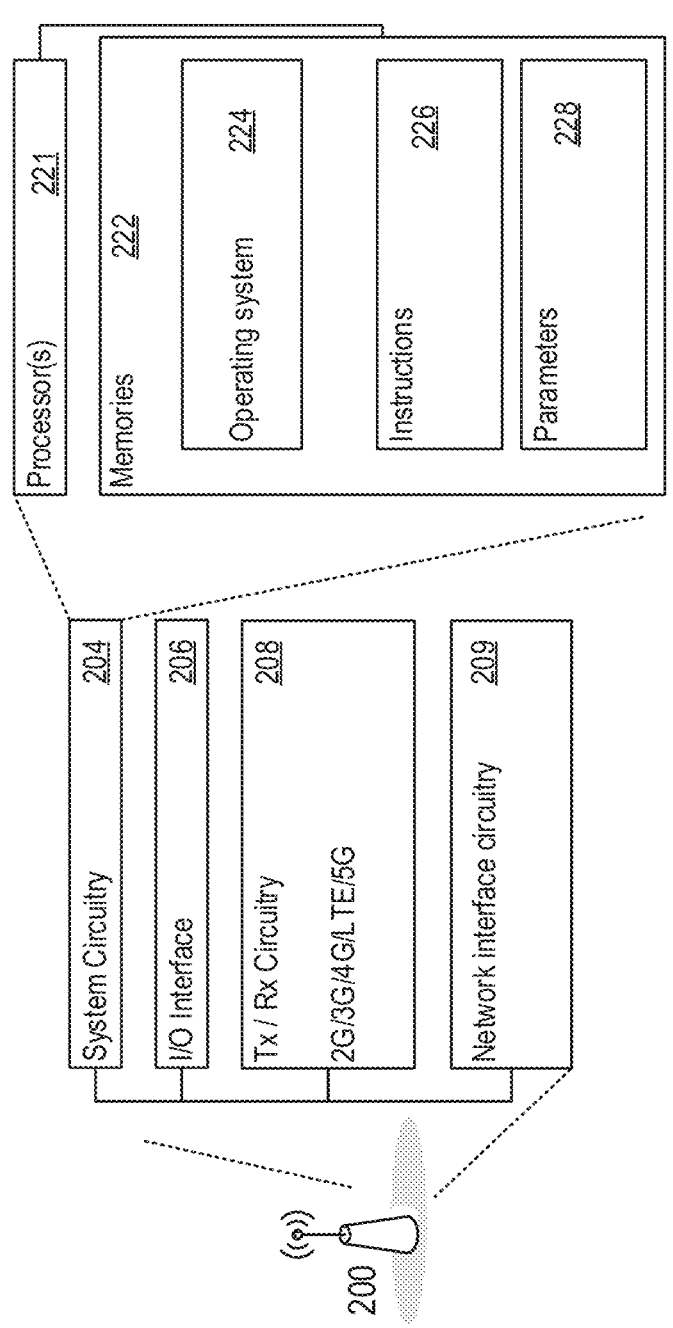
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
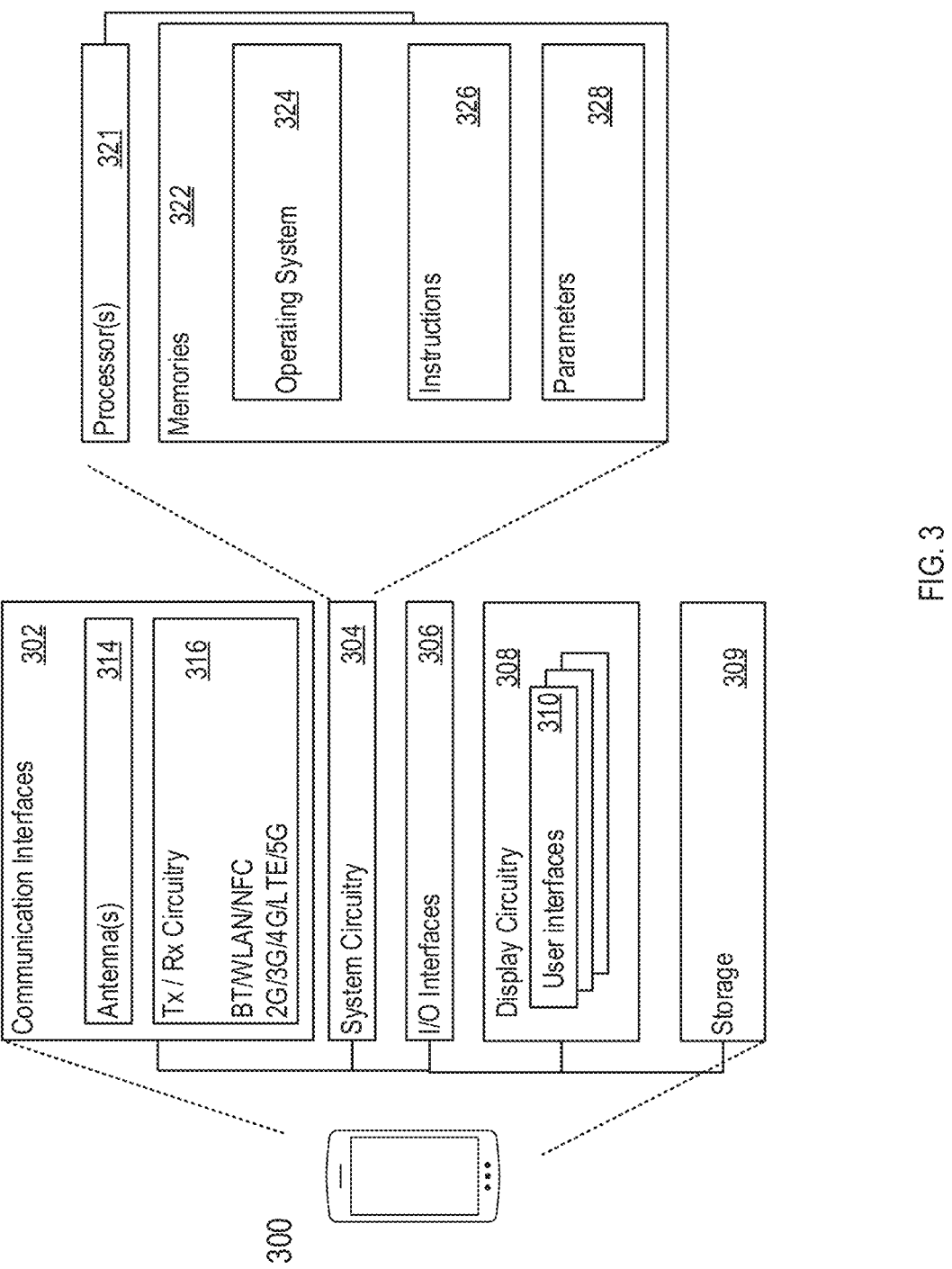
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements.

Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G standards, and/or 6G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G, 6G, or other data that the UE 300 will send, or has received, through the communication interfaces 302. In various implementations, a system power for the UE 300 may be supplied by a power storage device, such as a battery or a transformer.

The present disclosure describes various embodiment for resolving/handling directional conflicts in SBFD or CA-SBFD systems under certain circumstances, which may be implemented, partly or totally, on the network base station and/or the user equipment described above in FIGS. 2-3. The various embodiments in the present disclosure may enable handling of directional conflict in SBFD system, which may reduce gNB's implementation complexity, increase the resource utilization efficiency, and/or boost latency performance of URLLC traffic.

Referring to FIG. 4A, the present disclosure describes various embodiments of a method 400 for wireless communication. The method may include a portion or all of the following steps: step 410: obtaining, by a user equipment (UE), a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the UE and a base station in opposite directions; step 420: determining, by the UE, whether to cancel at least a portion of the first communication occasion or to cancel at least a portion of the second communication occasion based on first information of the first communication occasion and second information of the second communication occasion; step 430: in response to determining to cancel at least the portion of the second communication occasion, canceling, by the UE, at least the portion of the second communication occasion and performing the first communication occasion; and/or step 440: in response to determining to cancel at least the portion of the first communication occasion, canceling, by the UE, at least the portion of the first communication occasion and performing the second communication occasion.

In various embodiments in the present disclosure, the term "cancel" or "cancellation" in this context may mean dropping the transmission or reception in original time/frequency; and/or the transmission or reception may be changed (or re-scheduled) to other time/frequency resources.

In various embodiments in the present disclosure, the term of the UE "performs" a communication occasion may mean the UE executes the communication occasion when the communication occasion is a uplink occasion, the UE transmit the communication occasion to the base station; and/or when the communication occasion is a downlink occasion, the UE receives the communication occasion from the base station.

Figure 4B:
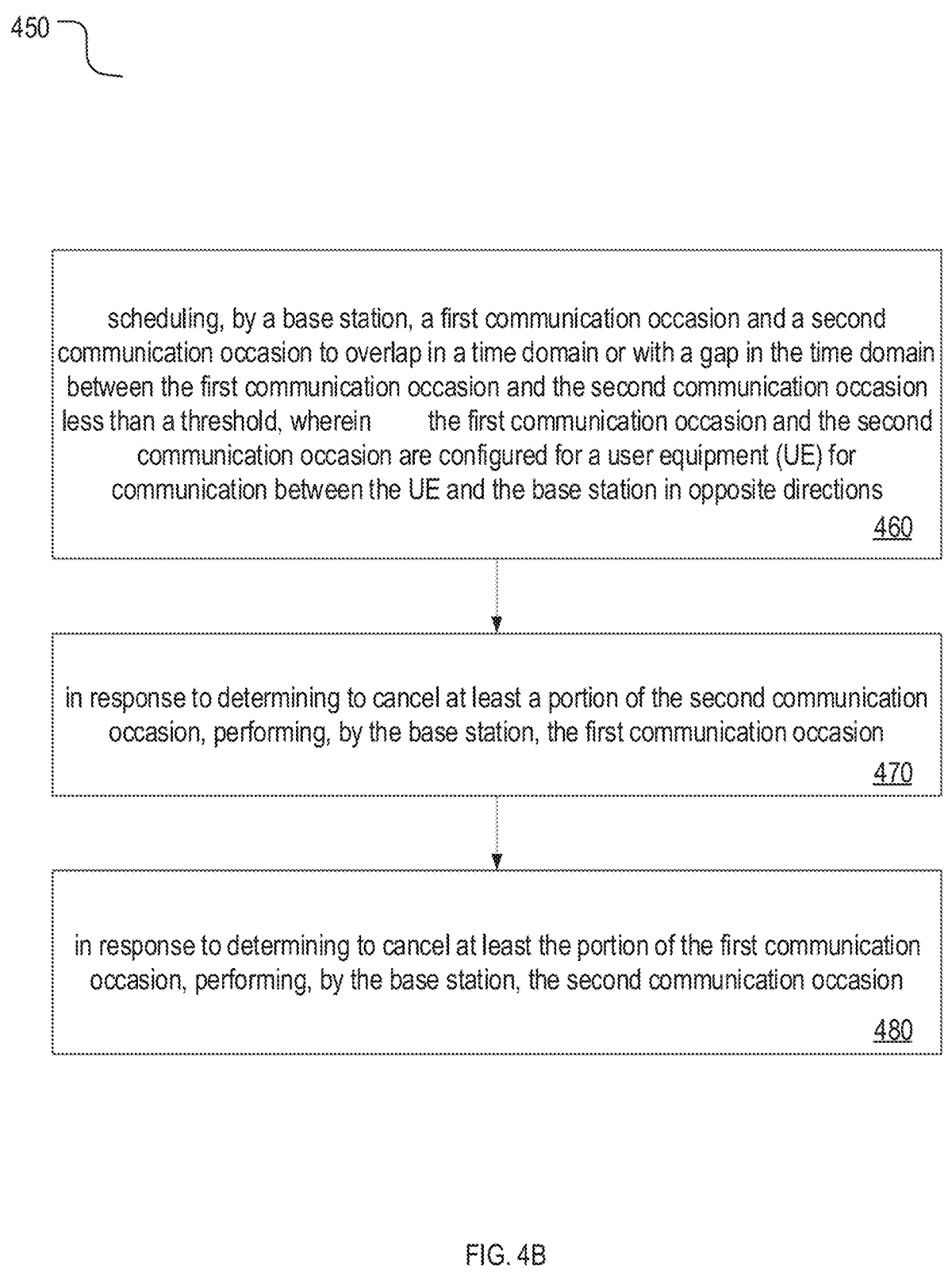

Referring to FIG. 4B, the present disclosure describes various embodiments of a method 450 for wireless communication. The method may include a portion or all of the following steps: step 460: scheduling, by a base station, a first communication occasion and a second communication occasion to overlap in a time domain or with a gap in the time domain between the first communication occasion and the second communication occasion less than a threshold, wherein the first communication occasion and the second communication occasion are configured for a user equipment (UE) for communication between the UE and the base station in opposite directions; step 470: in response to determining to cancel at least a portion of the second communication occasion, performing, by the base station, the first communication occasion; and/or step 480: in response to determining to cancel at least the portion of the first communication occasion, performing, by the base station, the second communication occasion.

In various embodiments in the present disclosure, the term of the base station "performs" a communication occasion may mean the base station executes the communication occasion when the communication occasion is a uplink occasion, the base station receives the communication occasion from the UE; and/or when the communication occasion is a downlink occasion, the base station transmit the communication occasion to the UE.

In some implementations, the first communication occasion is configured in a first cell and the second communication occasion is configured in a second cell; or the first communication occasion is configured in a first frequency resource and the second communication occasion is configured in a second frequency resource.

In some other implementations, the first information of the first communication occasion comprises at least one of the following: configuration-type information indicating whether the first communication occasion is a first configuration-type or a second configuration-type, priority-level information indicating a priority level of the first communication occasion, communication-direction information indicating whether the first communication occasion is a downlink occasion or an uplink occasion, an uplink cancellation indication indicating to cancel the first communication occasion when the first communication occasion is an uplink occasion, or a downlink preemption indication or a downlink deactivation indication indicating to cancel the first communication occasion when the first communication occasion is a downlink occasion; and/or the second information of the second communication occasion comprises at least one of the following: configuration-type information indicating whether the second communication occasion is a first configuration-type or a second configuration-type, priority-level information indicating a priority level of the second communication occasion, communication-direction information indicating whether the second communication occasion is a downlink occasion or an uplink occasion, an uplink cancellation indication indicating to cancel the second communication occasion when the second communication occasion is an uplink occasion, or a downlink preemption indication or a downlink deactivation indication indicating to cancel the second communication occasion when the second communication occasion is a downlink occasion.

In some other implementations, the first configuration-type indicates a semi-statically configured communication occasion; and/or the second configuration-type indicates a dynamically scheduled communication occasion.

In various embodiments in the present disclosure, a "RRC D", which may be derived from radio resource control downlink, and "RRC U", which may be derived from radio resource control uplink, may be referred to semi-statically configured downlink and uplink channels/signals respectively, which are not dependent on dynamic signaling. For example but not limited to, the RRC D may be a channel state information reference signal (CSI-RS), control resource set (CORESET)/search space for physical downlink control channel (PDCCH), synchronization signal block (SSB), or semi-persistent scheduling physical downlink shared channel (SPS-PDSCH). For example but not limited to, the RRC U may be sounding reference signal (SRS), physical random access channel (PRACH), configure grant physical uplink shared channel (CG PUSCH), periodic physical uplink control channel (PUCCH) for channel state information (CSI) (i.e., persistent/semi-persistent (P/SP) CSI), scheduling request (SR), buffer state report (BSR), or hybrid automatic repeat request acknowledgement (HARQ-ACK) of SPS-PDSCH.

In various embodiments in the present disclosure, a "dynamic D" and "dynamic U" may be referred to dynamically scheduled downlink and uplink channel/signal respectively, which, being different from "RRC D/U", need dynamical signaling to trigger. For example but not limited to, the dynamic D may be dynamically scheduled PDSCH, aperiodic CSI-RS (A-CSI-RS). For example but not limited to, the dynamic U may be dynamically scheduled PUSCH, aperiodic SRS, PUCCH/PUSCH for A-CSI, HARQ-ACK of dynamically scheduled PDSCH.

In various embodiments in the present disclosure, various level of priority may be assigned for different channels/signals, including, for example, high priority "RRC D", high priority "RRC U", low priority "RRC D", low priority "RRC U", high priority "dynamic D", high priority "dynamic U", low priority "dynamic D", and/or low priority "dynamic U".

In some implementations, the priority level may be referred as priority-level information indicating a priority level of the second communication occasion. In some implementation, a higher value of the priority level may indicate a higher priority, for example, a communication occasion with a priority level of 3 has a higher priority than another communication occasion with a priority level of 1. In some other implementation, a higher value of the priority level may indicate a lower priority, for example, a communication occasion with a priority level of 3 has a lower priority than another communication occasion with a priority level of 1.

In various embodiments, directional conflict may occur for Dynamic D/U in one cell and Dynamic U/D in another cell. Various scenarios with a first communication occasion and a second communication occasion are described in details below.

In some implementations, the first communication occasion is the second configuration-type and the downlink occasion; the second communication occasion is the second configuration-type and the uplink occasion; the first communication occasion has a higher priority than the second communication occasion; and the UE determines to cancel one of the following: the second communication occasion in its entirety, or at least the portion of the second communication occasion that overlaps with the first communication occasion in the time domain.

In some other implementations, in response to a control signaling or control signaling resource that schedules the first communication occasion overlapping with the second communication occasion, the UE cancels the at least the portion of the second communication occasion at a beginning of the control signaling or control signaling resource, and/or in response to the control signaling or control signaling resource that schedules the first communication occasion not overlapping with the second communication occasion, the UE cancels the at least the portion of the second communication occasion at a time duration after an end of the control signaling. In some implementations, the control signaling may include CORESET or SS occasion.

In some other implementations, the first communication occasion is the second configuration-type and the uplink occasion; the second communication occasion is the second configuration-type and the downlink occasion; the first communication occasion has a higher priority than the second communication occasion; and the UE determines to cancel one of the following: the second communication occasion in its entirety, or at least the portion of the second communication occasion that overlaps with the first communication occasion in the time domain.

Figure 5A:
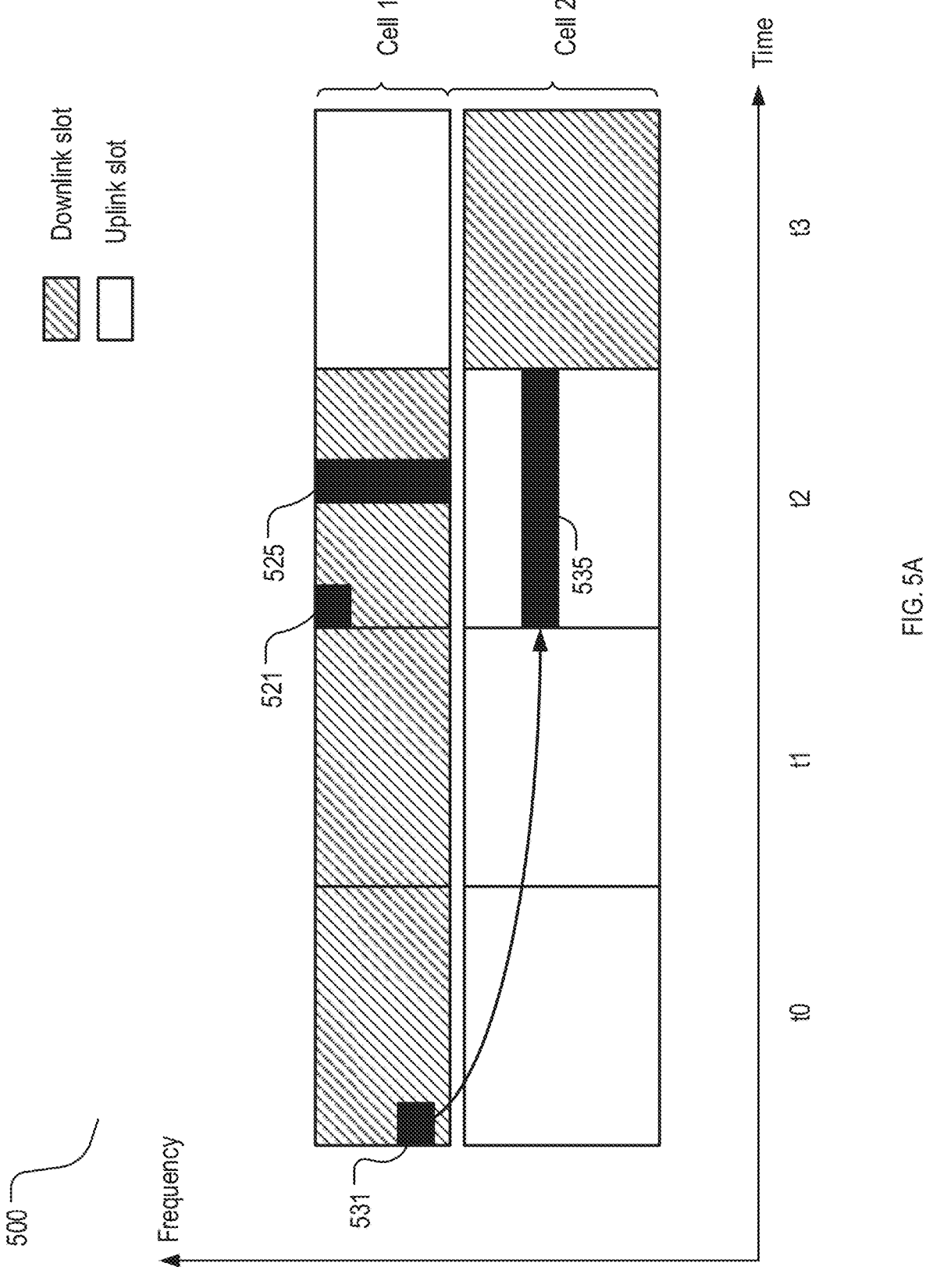
FIG. 5A shows a schematic diagram of an exemplary embodiment for wireless communication.

In one scenario 500 as shown in FIG. 5A, high priority "dynamic D" in one cell may overlap with low priority "dynamic U" in another cell in the time domain. For example but not limited to, the high priority dynamic D may be a URLLC PDSCH 525 in a time slot (t2) in cell 1, and the low priority dynamic U may be an enhanced mobile broadband (eMBB) PUSCH 535 in a time slot (t2) in cell 2. In some implementations, an eMBB PDCCH 531 may schedule/signal the eMBB PUSCH 535, and/or a URLLC PDCCH 521 in a high priority CORESET or SS may schedule/signal the URLLC PDSCH 525. Under this scenario 500, the high priority "dynamic D" may be prioritized, and the low priority "dynamic U" may be dropped, cancelled, delayed, postponed, or deferred.

As shown in FIG. 5A, the pre-configured high priority PDCCH 521 (e.g., URLLC PDCCH) occasion (e.g., CORESET and/or SS) may prioritize high priority PDCCH reception 525 when directional conflict with low priority PUSCH 535 (e.g., eMBB PUSCH) occurs. Then when the low priority PUSCH overlaps with both high priority PDCCH occasion and corresponding PDSCH, the dropping of low priority may also solve the conflict between the low priority PUSCH and high priority PDSCH.

It is noted that the PDSCH scheduled by PDCCH in high priority PDCCH occasion and/or corresponding HARQ-ACK may automatically be granted high priority instead of using priority indication in PDCCH.

Another alternative is to drop high priority PDCCH occasion and prioritize low priority PUSCH as gNB will ensure that there will no high priority PDCCH transmission in high priority PDCCH occasion then it schedules a low priority PUSCH overlapping with the high priority PDCCH occasion.

Figure 5B:
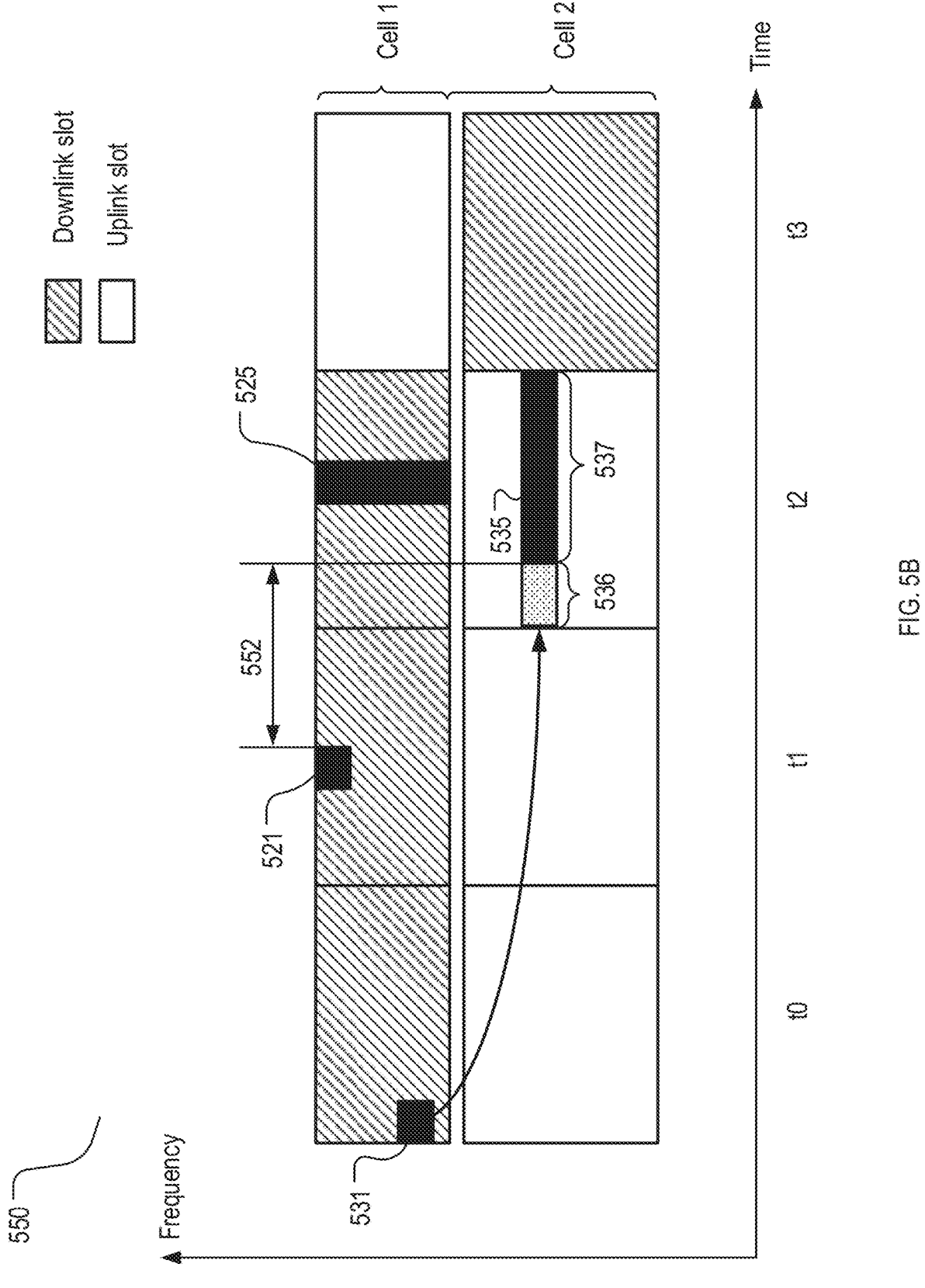
FIG. 5B shows a schematic diagram of another exemplary embodiment for wireless communication.

FIG. 5B shows another scenario 550 wherein there is only directional conflict between high priority PDSCH and low priority PUSCH. The cancellation may start at a time duration 552 after the end of high priority PDCCH. In some implementations, the time duration 552 may be a summation of a PDCCH blind detection (BD) time plus a canceling time. For example, within the low priority PUSCH 535, a first portion 536 is not canceled, and only a second portion 537 is canceled/dropped/delayed.

Figure 5C:
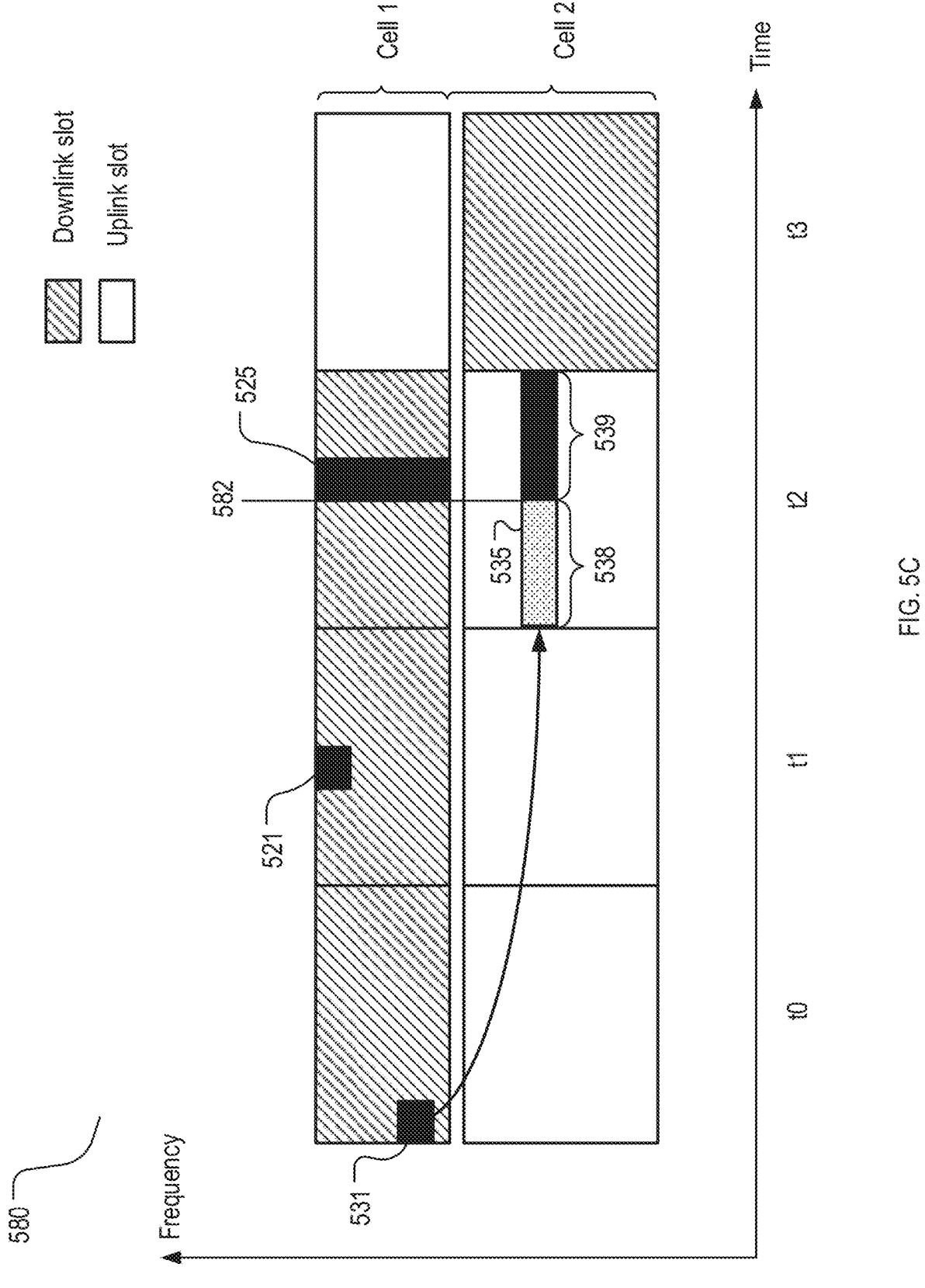
FIG. 5C shows a schematic diagram of another exemplary embodiment for wireless communication.

FIG. 5C shows another scenario 580 wherein there is only directional conflict between high priority PDSCH and low priority PUSCH. Different from the implementation under the scenario 550, under the scenario 580, the cancellation starts at a time point (582) of the beginning of the high priority PDSCH 525. Hence, for example, within the low priority PUSCH 535, a first portion 538 is not canceled, and only a second portion 539 starting at the time point 582 is canceled/dropped/delayed.

In some implementations, to enable the time for cancellation, there should be a predefined non-zero gap between the PDCCH scheduling/signaling the high priority PDSCH and the high priority PDSCH.

Figure 6:
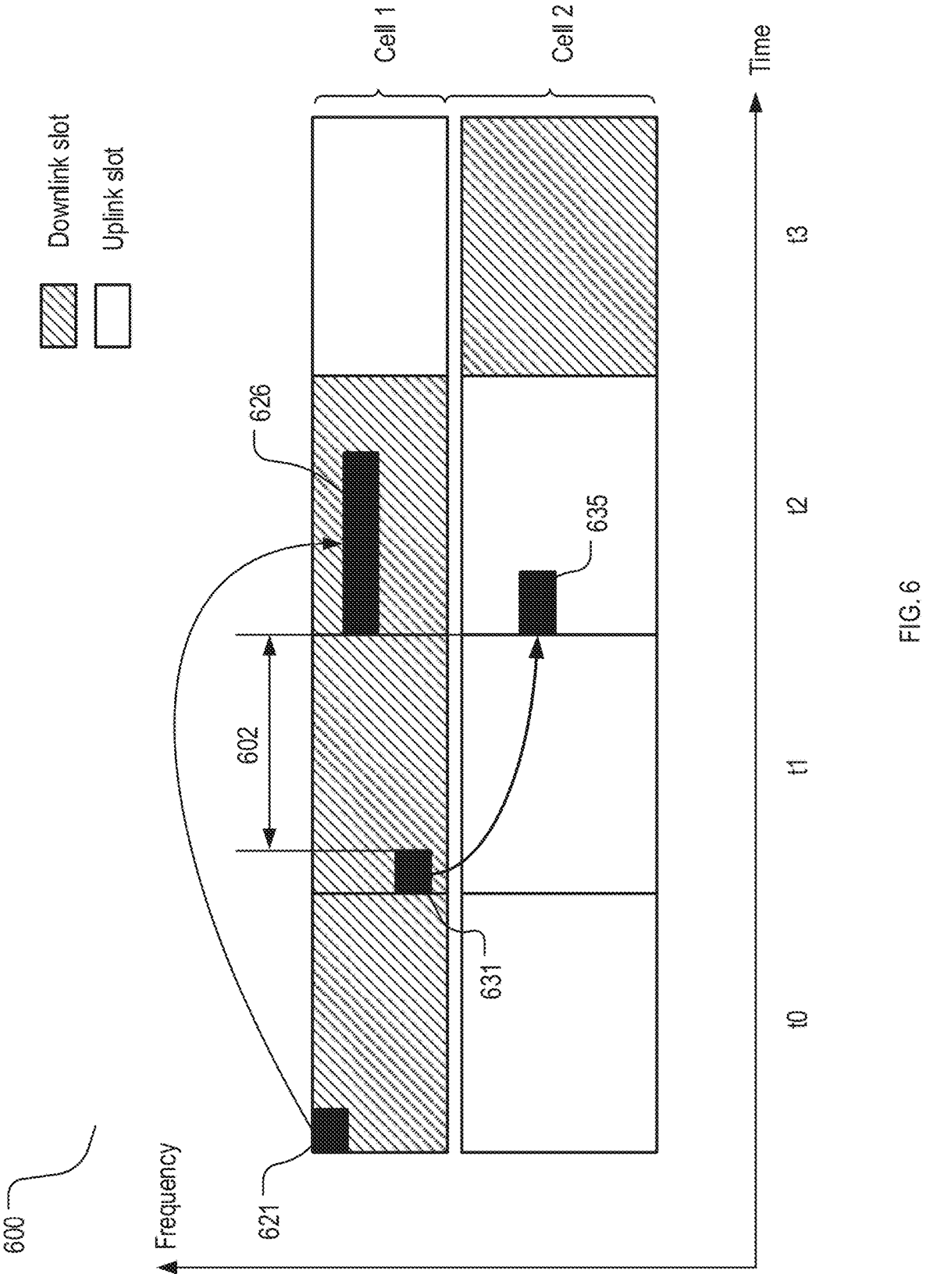
FIG. 6 shows a schematic diagram of another exemplary embodiment for wireless communication.

In another scenario 600 as shown in FIG. 6, high priority "dynamic U" in one cell overlaps with low priority "dynamic D" in another cell in the time domain. For example but not limited to, the high priority dynamic U may be a URLLC PUSCH 635 in a time slot (t2) in cell 2, and the low priority dynamic D may be an enhanced mobile broadband (eMBB) PDSCH 626 in a time slot (t2) in cell 1. In some implementations, an eMBB PDCCH 621 may schedule/signal the eMBB PDSCH 626, and/or a URLLC PDCCH 631 may schedule/signal the URLLC PUSCH 635. Under this scenario 600, the high priority "dynamic U" (e.g., URLLC PUSCH) may be prioritized, and the low priority "dynamic D" (e.g., eMBB PDSCH) may be dropped, cancelled, delayed, postponed, or deferred. In some implementations, there is a time duration 602 between the URLLC PDCCH 631 and the beginning of the cancellation of the eMBB PDSCH 626. The time duration 602 may include PDCCH blind detection (BD) time, and/or PDSCH reception cancel time.

In various embodiments, directional conflict may occur for RRC D/U in one cell and Dynamic U/D in another cell. Various scenarios with a first communication occasion and a second communication occasion are described in details below.

In some implementations, the first communication occasion is the first configuration-type and the downlink occasion; the second communication occasion is the second configuration-type and the uplink occasion; the first communication occasion has a higher priority than the second communication occasion; in response to the UE not receiving an uplink cancellation indication: the UE determines to cancel or postpone the first communication occasion; and/or in response to the UE receiving the uplink cancellation indication: the UE determines to cancel the second communication occasion.

In some other implementations, the first communication occasion is the first configuration-type and the downlink occasion; the second communication occasion is the second configuration-type and the uplink occasion; the first communication occasion has a same priority as the second communication occasion; in response to the UE not receiving an uplink cancellation indication: the UE determines to cancel or postpone the first communication occasion; and/or in response to the UE receiving the uplink cancellation indication: the UE determines to cancel the second communication occasion.

In some other implementations, the first communication occasion is the first configuration-type and the downlink occasion; the second communication occasion is the second configuration-type and the uplink occasion; the first communication occasion has a higher priority than the second communication occasion; in response to the UE receiving a downlink preemption indication for the first communication occasion: the UE determines to cancel the first communication occasion; and/or in response to the UE receiving a downlink deactivation indication for the first communication occasion: the UE determines to deactivate the first communication occasion; and/or in response to the UE not receiving the downlink preemption indication or the downlink deactivation indication for the first communication occasion: the UE determines to cancel or defer the second communication occasion.

In some other implementations, the first communication occasion is the first configuration-type and the downlink occasion; the second communication occasion is the second configuration-type and the uplink occasion; the first communication occasion has a lower priority than the second communication occasion; and/or the UE determines to cancel or postpone the first communication occasion.

In some other implementations, the UE drops a negative acknowledgement signal for the canceled or postponed first communication occasion; or the UE feeds back the negative acknowledgement signal for the canceled or postponed first communication occasion.

In some other implementations, the first communication occasion is the first configuration-type and the uplink occasion; the second communication occasion is the second configuration-type and the downlink occasion; the first communication occasion has a lower priority than the second communication occasion; and/or the UE determines to cancel or postpone the first communication occasion.

In some other implementations, the first communication occasion is the first configuration-type and the uplink occasion; the second communication occasion is the second configuration-type and the downlink occasion; the first communication occasion has a higher priority than the second communication occasion; and/or the UE determines a discontinuous transmission or incorrect reception of the second communication occasion.

In some other implementations, the first communication occasion is the first configuration-type; the second communication occasion is the second configuration-type; the first communication occasion has a same priority as the second communication occasion; and/or the UE determines to cancel or postpone the first communication occasion.

In some other implementations, the first communication occasion is the first configuration-type and the uplink occasion; the second communication occasion is the second configuration-type and the downlink occasion; the first communication occasion has a same priority as the second communication occasion; and/or the UE determines to cancel or postpone the first communication occasion.

Figure 7A:
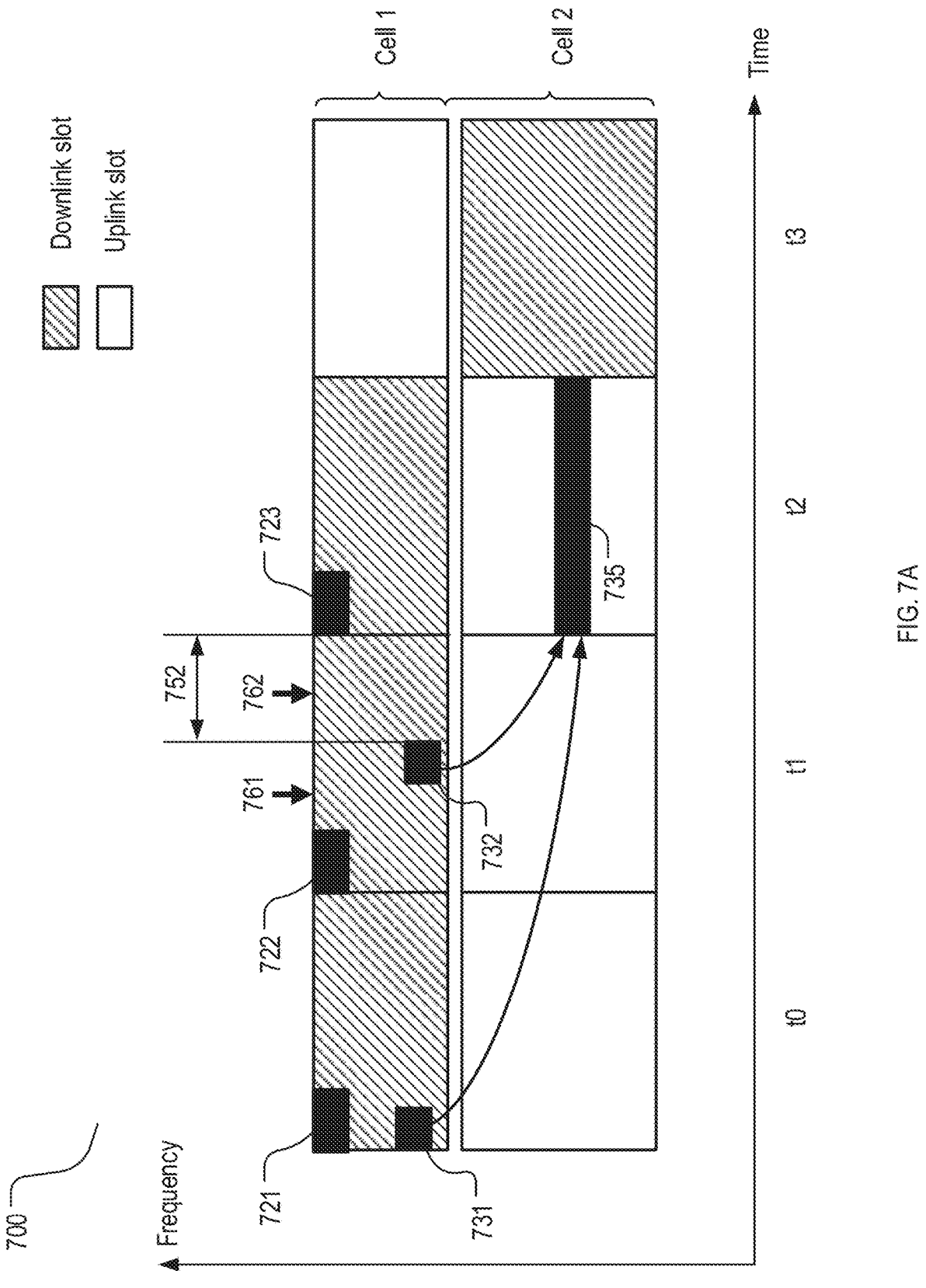
FIG. 7A shows a schematic diagram of another exemplary embodiment for wireless communication.

In another scenario 700 as shown in FIG. 7A, a high priority RRC D (e.g., SPS or CORESET/SS) in one cell overlaps with a low priority "dynamic U" (e.g., dynamically scheduled PUSCH) in another cell in the time domain. For example but not limited to, the high priority RRC D may be a SPS occasion for URLLC (721, 722, 723) in each downlink slot in cell 1, and the low priority dynamic U may be an eMBB PUSCH/PUCCH 735. In some implementations, an eMBB PDCCH 731 may schedule/signal the eMBB PUSCH/PUCCH 735.

In some implementations, the low priority dynamic U may be dropped, cancelled, delayed, postponed, or deferred. RRC D data/signal may arrive during the interval between UL grant and dynamic U (e.g., the time point 761, wherein URLLC data arrival can be transmitted in next SPS occasion due to satisfied timeline), which allows time for canceling dynamic U.

In some other implementations, canceling/dropping/delaying/postponing/deferring dynamic U may be performance in response to receiving an UL cancellation indication (732 UL CI). When dynamic U is canceled by UL CI 732, the UE may receive RRC D. When dynamic U can't be canceled by UL CI due to a timeline (e.g., at a time point 762, wherein ULLC data arrival may not be transmitted in next SPS occasion due to unsatisfied timeline), the UE may transmit the dynamic U and the gNB may postpone the DL data. When there is no UL CI, the UE may transmit the dynamic U and/or may not receive the high priority "RRC D" (e.g., SPS) as there may not be DL data in e.g., the high priority "RRC D" occasion.

In another scenario wherein a RRC D and a dynamic U share the same priority, the above implementations may be similarly applicable to the RRC D and the dynamic U having same priority.

In some other implementations, the high priority RRC D may be cancelled or de-activated. Alternatively, the high priority RRC D may be delayed, postponed, or deferred.

Figure 7B:
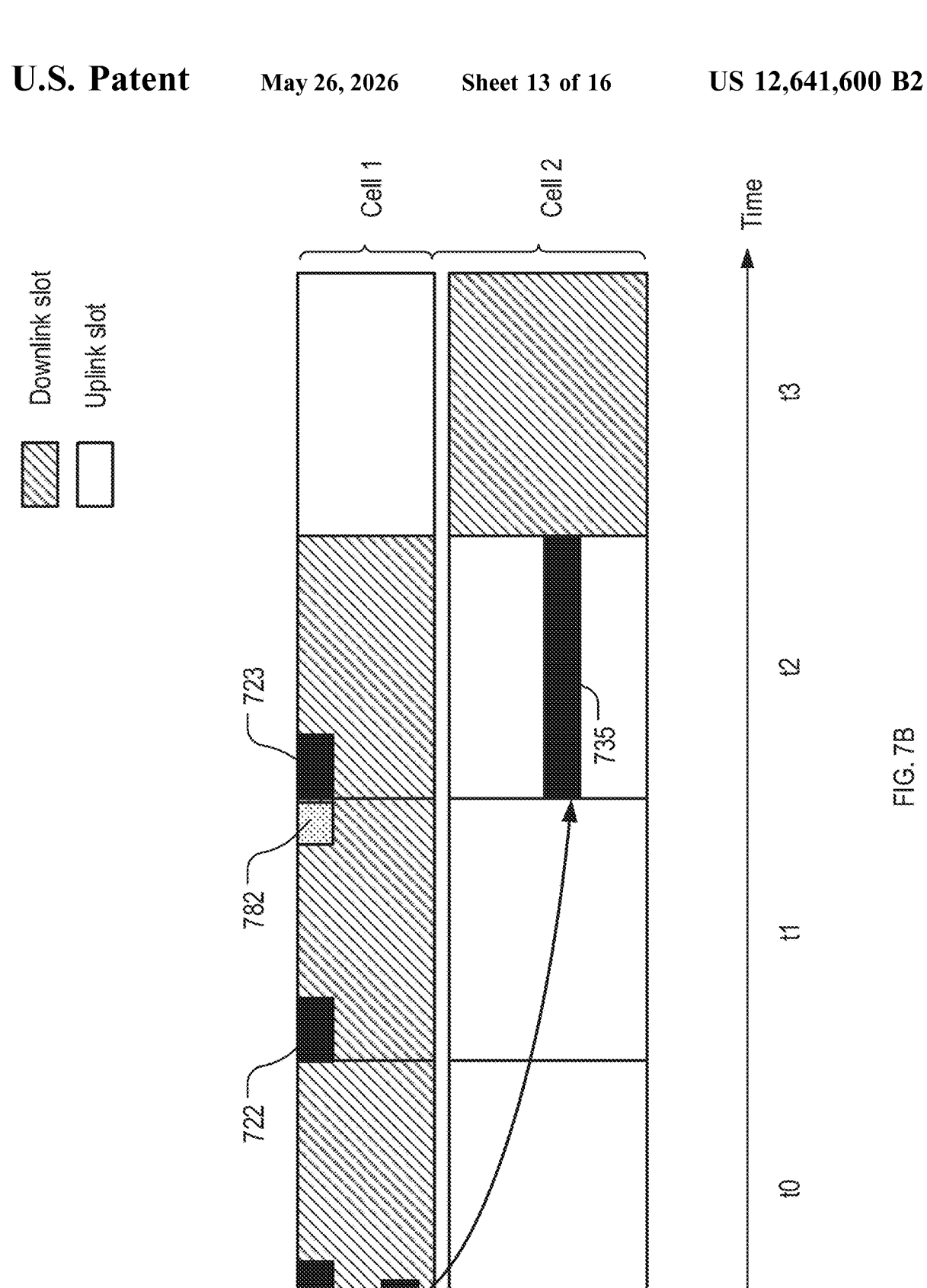
FIG. 7B shows a schematic diagram of another exemplary embodiment for wireless communication.

In some other implementations in FIG. 7B, RRC D may be canceled in response to receiving a DL signaling e.g., DL preemption indication (782, DL PI) or deactivation (e.g., for SPS). When the RRC D is canceled or deactivated in one cell, the dynamic U transmission may be allowed. Otherwise, the RRC D may be prioritized. In some implementations, cancelling downlink occasion may be much shorter than canceling uplink occasion, so that DL PI may be very close to next SPS occasion for URLLC. For example, the UE may prepare dynamic U after receiving scheduling signaling; the UE may perform UL transmission T ms after receiving DL PI/deactivation 782; and/or the UE may cancel or defer UL transmission if not receiving DL PI/deactivation. In this scenario, T may be a very small time duration, which may be very close to 0 or as small as less than 1 millisecond, as UL channel/signal already stands by. Hence, this implementation may reduce the likelihood of delaying high priority RRC D (e.g., URLLC data) due to short cancellation time of RRC D compared with some other implementations.

In another scenario, a low priority "RRC D" (e.g., SPS) in one cell may overlap with a high priority "dynamic U" in another cell in the time domain. In some implementations, the UE may transmit the dynamic U and drop the RRC D reception and feed back NACK (if exist) for the dropped RRC D (e.g., SPS). In some other implementations, optionally, the UE may drop NACK for saving overhead as it is a deterministic information.

In another scenario, a low priority "RRC U" (e.g., CG PUSCH) in one cell may overlap with a high priority dynamic D in another cell in the time domain. In some implementations, the UE may drop the RRC U and receive the dynamic D.

In another scenario, a high priority "RRC U" (e.g., CG PUSCH) in one cell may overlap with a low priority dynamic D in another cell in the time domain. In some implementations, the UE may assume discontinuous transmission (DTX) or incorrect reception of dynamic scheduling D if there is an overlapping high priority data in CG PUSCH. Otherwise, i.e., when there is no overlapping or no conflict, the UE receives dynamic scheduling D.

In another scenario, a RRC D/U in one cell and dynamic U/D in another cell may have same priority and overlap in time domain. In some implementations, the UE may always transmit the dynamic U/D, and cancel the RRC D/U. In some other implementations for a RRC D and a dynamic U overlapping in the time domain, the UE may work with DL or UL cancellation similarly as the scenario discussed above. For In some other implementations for a RRC U and a dynamic D overlapping in the time domain, the UE may prioritize dynamic D or implement similarly as the scenario discussed above for up to UE implementation.

In various embodiments, directional conflict may occur for RRC D/U in one cell and RRC U/D in another cell. Various scenarios with a first communication occasion and a second communication occasion are described in details below.

In some implementations, the first communication occasion is the first configuration-type and the downlink occasion; the second communication occasion is the first configuration-type and the uplink occasion; the first communication occasion has a higher priority than the second communication occasion; and/or the UE determines to cancel or postpone the second communication occasion.

In some other implementations, the first communication occasion is the first configuration-type and the downlink occasion; the second communication occasion is the first configuration-type and the uplink occasion; the first communication occasion has a higher priority than the second communication occasion; in response to receiving a downlink preemption indication or a downlink deactivation indication for the first communication occasion, the UE determines to cancel or postpone the first communication occasion; and/or in response to not receiving the downlink preemption indication and the downlink deactivation indication for the first communication occasion, the UE determines to cancel or postpone the second communication occasion.

In some other implementations, the first communication occasion is the first configuration-type and the downlink occasion; the second communication occasion is the first configuration-type and the uplink occasion; the first communication occasion has a higher priority than the second communication occasion; in response to receiving an uplink cancellation indication for the second communication occasion, the UE determines to cancel or postpone the second communication occasion; and/or in response to not receiving the uplink cancellation indication for the second communication occasion, the UE determines to cancel or postpone the first communication occasion.

In some other implementations, the first communication occasion is the first configuration-type and the downlink occasion; the second communication occasion is the first configuration-type and the uplink occasion; the first communication occasion has a higher priority than the second communication occasion; in response to receiving a downlink preemption indication or a downlink deactivation indication for the first communication occasion, the UE determines to cancel or postpone the first communication occasion; in response to receiving an uplink cancellation indication for the second communication occasion, the UE determines to cancel or postpone the second communication occasion; and/or in response to not receiving the downlink preemption indication or the downlink deactivation indication for the first communication occasion and not receiving the uplink cancellation indication for the second communication occasion, the UE determines to cancel or postpone the second communication occasion.

In some other implementations, the first communication occasion is the first configuration-type and the downlink occasion; the second communication occasion is the first configuration-type and the uplink occasion; the first communication occasion has a higher priority than the second communication occasion; and/or in response to the first communication occasion and the second communication occasion being re-activated to indicate that the first communication occasion has a lower priority than the second communication occasion, the UE determines to cancel or postpone the first communication occasion.

In some other implementations, the first communication occasion is the first configuration-type and the downlink occasion; the second communication occasion is the first configuration-type and the uplink occasion; the first communication occasion has a higher priority than the second communication occasion; and/or in response to the first communication occasion being re-activated to indicate that the first communication occasion has a lower priority than the second communication occasion, the UE determines to cancel or postpone the first communication occasion.

In some other implementations, the first communication occasion is the first configuration-type and the downlink occasion; the second communication occasion is the first configuration-type and the uplink occasion; the first communication occasion has a higher priority than the second communication occasion; and/or in response to the second communication occasion being re-activated to indicate that the second communication occasion has a higher priority than the first communication occasion, the UE determines to cancel or postpone the first communication occasion.

In some other implementations, the first communication occasion is the first configuration-type and the uplink occasion; the second communication occasion is the first configuration-type and the downlink occasion; the first communication occasion has a higher priority than the second communication occasion; and/or the UE determines to cancel or postpone the second communication occasion.

In some other implementations, the first communication occasion is the first configuration-type; the second communication occasion is the first configuration-type; the first communication occasion has a same priority as the second communication occasion; and/or the UE determines, according to a cancellation rule, to cancel or postpone the second communication occasion.

In some other implementations, the first communication occasion is the first configuration-type and the uplink occasion; the second communication occasion is the first configuration-type and the downlink occasion; the first communication occasion has a same priority as the second communication occasion; in response to receiving a downlink preemption indication or a downlink deactivation indication for the second communication occasion, the UE determines to cancel or postpone the second communication occasion; and/or in response to not receiving the downlink preemption indication and the downlink deactivation indication for the second communication occasion, the UE determines to cancel or postpone the first communication occasion.

In some other implementations, the first communication occasion is the first configuration-type and the uplink occasion; the second communication occasion is the first configuration-type and the downlink occasion; the first communication occasion has a same priority as the second communication occasion; in response to receiving an uplink cancellation indication for the first communication occasion, the UE determines to cancel or postpone the first communication occasion; and/or in response to not receiving the uplink cancellation indication for the first communication occasion, the UE determines to cancel or postpone the second communication occasion.

In some other implementations, the first communication occasion is the first configuration-type and the uplink occasion; the second communication occasion is the first configuration-type and the downlink occasion; the first communication occasion has a same priority as the second communication occasion; in response to receiving an uplink cancellation indication for the first communication occasion, the UE determines to cancel or postpone the first communication occasion; in response to receiving a downlink preemption indication or a downlink deactivation indication for the second communication occasion, the UE determines to cancel or postpone the second communication occasion; and/or in response to not receiving the uplink cancellation indication for the first communication occasion and not receiving the downlink preemption indication and the downlink deactivation indication for the second communication occasion, the UE determines to cancel or postpone the second communication occasion.

Figure 8A:
FIG. 8A shows a schematic diagram of another exemplary embodiment for wireless communication.

In another scenario 800 as shown in FIG. 8A, a high priority RRC D (e.g., SPS) in one cell may overlap with a low priority RRC U (e.g., CG PUSCH) in another cell in the time domain. For example but not limited to, the RRC D may be SPS occasion for URLLC (821, 822, and 823), and/or the RRC U may include a first RRC U configuration (831, 835, RRC U conf1) and/or a second RRC U configuration (841, 845, RRC U conf2).

In some implementations, the RRC D occasion in one cell may always cancel the RRC U occasion in another cell. Although this implementation may be simple, it may not be very efficient considering the high priority SPS occasion with short periodicity may unnecessarily block many RRC U transmissions in the case of sporadic DL URLLC data profile. Hence, in some other implementations, there may be pre-configured cancellation rule for a certain RRC D+RRC U combination.

In some other implementations, DL PI and/or UL CI may be used to dynamically indicate which one should be canceled. In one implementation, the high priority RRC D 823 may be canceled in response to receiving DL PI or deactivation 852 of SPS, as shown in FIG. 8A. The DL PI or deactivation 852 may indicate there is no DL data. when the RRC D 823 is canceled, the UE may transmit the low priority RRC U (e.g., 835); otherwise, the UE receives the high priority RRC D. In some implementations, deactivation of SPS signaling may only deactivate a limited number of following SPS.

In some other implementation wherein multiple RRC U occasions are scheduled, as shown in FIG. 8A, the RRC U conf1 in occasion t0 831 is canceled and the UE can select RRC U conf2 841 in occasion t0 if available. Configuring multiple LOW priority CG configurations may not be cost efficient.

Some of the above implementations may avoid delaying high priority DL data due to the possible short processing gap of DL PI. Some of the above implementations may be a signaling consuming method as w DL PI or activation/deactivation signaling may be frequently sent in all RRC U occasions due to lack of knowledge on UL data arrival (e.g., CG-PUSCH) at gNB or definite UL transmission (e.g., SRS). Deactivation of SPS is expected to be different from a certain mechanism, which may deactivate all of subsequent SPS occasions until re-activation signaling is received. Here the deactivation of SPS may only deactivate one SPS occasion and re-activation signaling is saved.

Figure 8B:
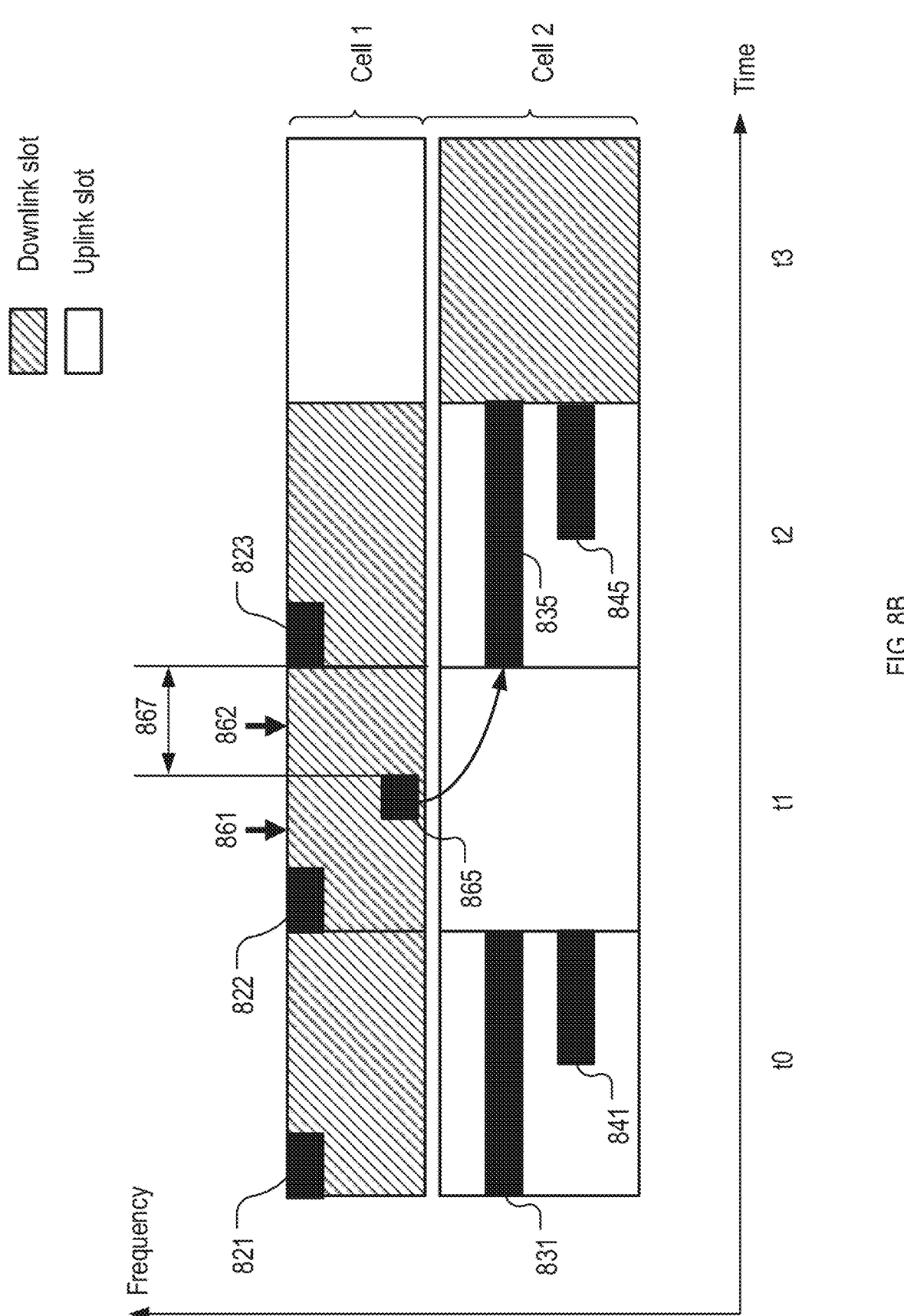
FIG. 8B shows a schematic diagram of another exemplary embodiment for wireless communication.

In some other implementations as shown in FIG. 8B, the low priority RRC U (e.g., 835) may be canceled when receiving a UL CI 865 or deactivation of CG-PUSCH. When the RRC U 835 is canceled, the UE receives the RRC D 823; otherwise, the UE transmits the RRC U. There is cost associated with this implementation: canceling uplink occasions (e.g., RRC U 835) may take longer time to cancel; and thus, when the UL CI 865 is not received in time, SPS may be canceled. For example, as shown in FIG. 8B, the RRC U conf1 in occasion t2 (835) is canceled and UE may select the RRC U conf2 in occasion t2 (845) if available.

In some other implementations with multiple sets of RRC U configurations, when the RRC D occasion overlaps with any RRC U's configuration's occasion and canceling signaling is not received, the RRC D occasion in t0 (821) may be canceled, as shown in FIG. 8B; and thus, all RRC U's configurations may be available. For example, under certain circumstances that the gNB wants to use the RRC D occasion in t0 (821), the RRC U conf1 in t0 (831) may be canceled. Alternatively, in some other implementations, the RRC D occasion may not be canceled when some conditions are satisfied. For instance, when at least one RRC U configuration doesn't overlap with the RRC D, the RRC D occasion may be kept and the RRC U configuration with occasion overlapping with RRC D occasion is canceled, For example, the RRC U conf2 841 does not overlap with the RRC D 821, and thus, the RRC U conf1 831 is canceled and the RRC D 821 is kept.

In some other implementations, it may be efficient in terms of cancellation signaling overhead as UL CI is sent when there is DL URLLC data which is assumed to have sparse traffic characteristic, which may cause delay of some DL URLLC data as discussed above.

In some other implementations, either RRC D or RRC U can be canceled depending on whether a DL PI, a UL CI, or none is received. For example, when the DL PI is configured and received, the UE may cancel the RRC D and may transmit the RRC U; and when the UL CI is configured and received, the UE may cancel the RRC U and may receive the RRC D. When none is received, i.e., in a default situation, in some implementations, default may be to cancel the RRC U and receive the RRC D; and/or in some implementations, default may be to transmit the RRC U and cancel the RRC D.

In some other implementations, priority for RRC D and/or RRC U may be dynamically indicated (e.g., via re-activation), and then the one with low priority or the one being indicated with low priority may be canceled. Several methods may be used in the situation where there is no DL data for SPS and there is UL data for CG PUSCH. In one method, re-activation of SPS and CG may indicate low priority for SPS and high priority for CG, respectively. In another method, only re-activation of SPS indicates lower priority for SPS (lower than CG) for one or several occasion(s), and in some implementation, this may override the high layer configured high priority of SPS in these occasions. In another method, only re-activation of CG indicates higher priority for CG (higher than SPS) for one or several occasion(s), and in some implementation, this may override the high layer configured low priority of CG in these occasions.

In some other implementations, when there is DL data for SPS and there is NO UL data for CG PUSCH, similar implementation/method as discussed above with opposite indication may be performed.

Figure 9:
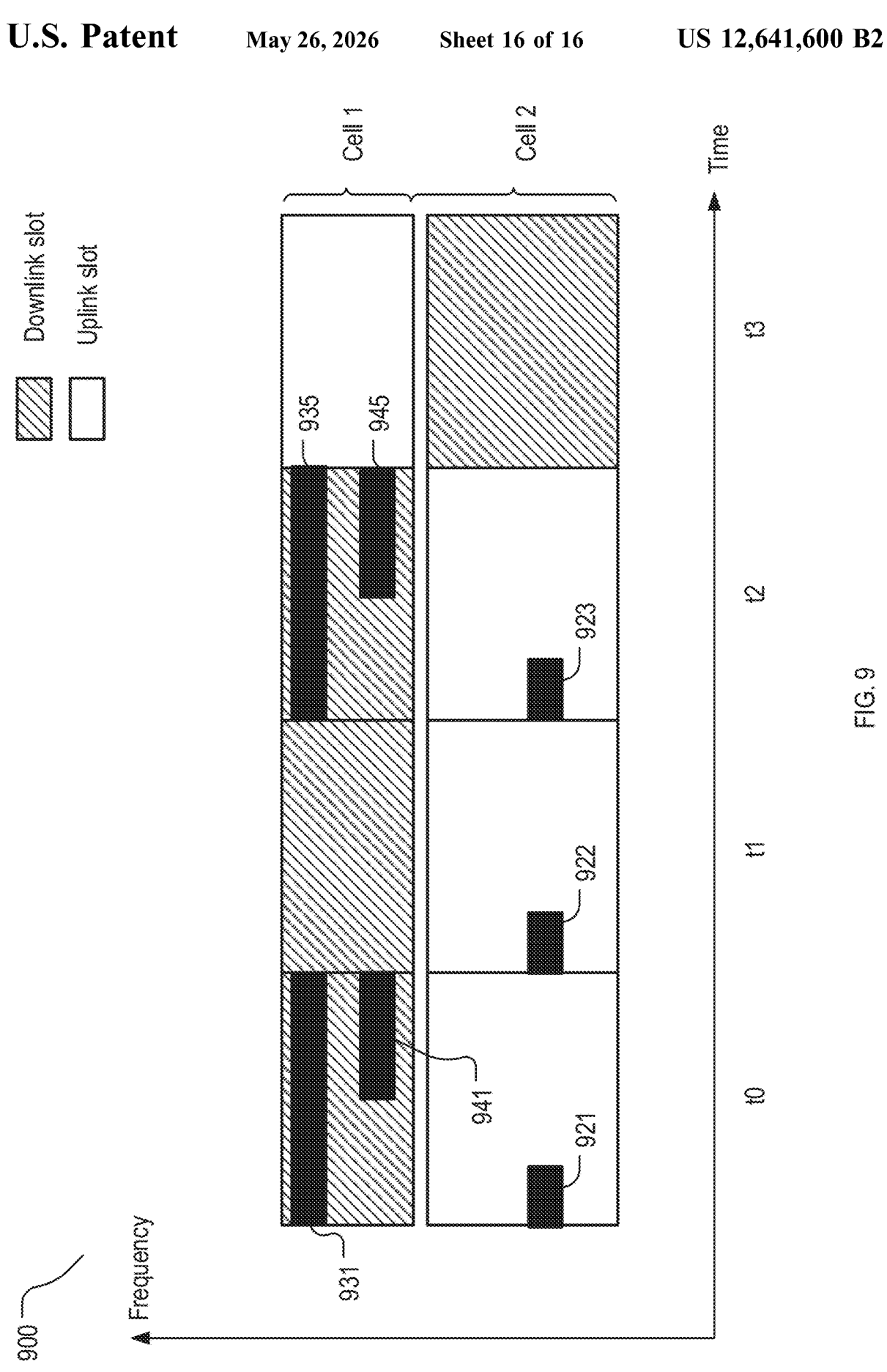
FIG. 9 shows a schematic diagram of another exemplary embodiment for wireless communication.

In another scenario 900 as shown in FIG. 9, a RRC U with high priority in one cell may overlap with a RRC D with low priority in another cell in the time domain. For example but not limited to, the RRC U may be CG occasion for URLLC (921, 922, and 923), and/or the RRC D may include a first RRC D configuration (931, 935, RRC D conf1) and/or a second RRC D configuration (941, 945, RRC D conf2).

In some implementations, the RRC U occasion in one cell may always cancel RRC D occasion in another cell.

In some other implementations, similar method/implementations as the above may be implemented.

In another scenario, the RRC D and the RRC U in two cells may share the same priority.

In some implementations, a pre-configured cancellation rule may be implemented for a certain RRC D and RRC U configuration.

In some other implementations, dynamic indication may be used to indicate which one has lower (or higher) priority, or to indicate which one to cancel (or keep). In one implementation, in response to receiving a DL PI or deactivation for SPS, the UE may cancel the RRC D and transmit the RRC U; otherwise the UE may cancel the RRC U and receive the RRC D.

In another implementation, in response to receiving a UL CI or deactivation of CG, the UE may cancel the RRC U and receive RRC D; otherwise the UE may cancel the RRC D and transmit the RRC U.

In another implementation, both DL PI and UL CI may be implemented: in response to receiving the DL PI, the UE may cancel the RRC D and transmit the RRC U; in response to receiving the UL CI, the UE may cancel the RRC U and receive the RRC D; otherwise when none is received, it may be up to the UE for implementation.

Various embodiments of the present disclosure may be summarized as below. Whether the UE performs transmission or reception in one cell or not may be determined by the DL signaling received by UE to cancel or deactivate the reception or transmission in another cell when transmission or reception in one cell overlaps with reception or transmission in another cell in time domain.

In some embodiments, canceling dynamic U in one cell enables reception of RRC D in another cell, when dynamic U has lower priority than RRC D or has the same priority as RRC D. When dynamic U is not canceled (e.g., due to no enough time for cancellation or no DL canceling signal), transmitting dynamic U is performed. Some embodiments of the present disclosure may prioritize high priority RRC D in the case of low priority dynamic U and high priority RRC D.

In some other embodiments, canceling or deactivating RRC D reception in one cell enables transmission dynamic U in another cell, when dynamic U has lower priority than RRC D In some other embodiments, canceling or deactivating RRC D reception in one cell enables RRC U transmission in another cell, when RRC D is configured or predefined or dynamically indicated as higher priority and/or RRC U is configured or predefined or dynamically indicated as lower priority. Some embodiments of the present disclosure may cancel a channel/signal with higher priority.

In some other embodiments, canceling or deactivating RRC U transmission in one cell enables RRC D reception in another cell, when RRC D is configured or predefined or dynamically indicated as higher priority and/or RRC U is configured or predefined or dynamically indicated as lower priority. When no canceling or deactivating signaling is received, UE performs RRC U transmission and dropping RRC D reception if the RRC U and RRC D overlaps in time domain. When no canceling or deactivating signaling is received and condition is satisfied, UE performs RRC D reception and dropping RRC U transmission if the RRC U and RRC D overlaps in time domain, which may include at least one of the followings: multiple configurations being provided for the RRC U; one or more configurations not overlapping with the RRC D or any configuration of the RRC D. Some embodiments of the present disclosure may prioritize lower priority channel/signal.

In some other embodiments, dynamic U in one cell may cancel RRC D in another cell, when dynamic U has higher or identical priority compared with RRC D. The feedback for RRC D is canceled or set to a predefined value.

In some other embodiments, RRC D in one cell always cancels RRC U in another cell when RRC D and RRC U overlaps in time domain, when RRC D has higher priority than RRC U or RRC D has the same priority as RRC U.

In some other embodiments, RRC U in one cell always cancels RRC D in another cell when RRC D and RRC U overlaps in time domain, when RRC D has lower priority than RRC U or RRC D has the same priority as RRC U.

In some other embodiments, dynamically indicating the priority of RRC U and/or RRC D may be preformed under various conditions. Under one condition, the UE performs RRC D reception and drops RRC U transmission when RRC D is indicated by gNB as higher priority and/or RRC U is indicated as lower priority. Under another condition, the UE performs RRC U transmission and dropping RRC D reception when RRC D is indicated by gNB as lower priority and/or RRC U is indicated as higher priority. The priority indication takes effect only for one or several occasion(s), and other occasions may have the priority configured by higher layer signaling. The priority indication overrides the priority configured by higher layer. When no dynamic priority indication is received for RRC D and/or RRC U, higher layer configured priority is used.

In some other embodiments, one CORESET and/or SS configured for UE is used for transmitting PDCCHs with a priority level or priority level higher than a threshold, when the channel/signal triggered or scheduled by the PDCCH and/or corresponding HARQ-ACK share the same priority level as the PDCCH; or when the channel/signal triggered or scheduled by the PDCCH and/or corresponding the HARQ-ACK can have different priority level from PDCCH.

In some other embodiments, when UE receives the CORESET and/or SS in one cell, it may cancel the transmission of uplink channel/signal in another cell. Specifically, when the CORESET/SS occasion doesn't overlap with the uplink channel/signal and there is a downlink channel/signal triggered or scheduled by the PDCCH transmitted in the CORESET/SS occasion, the cancellation start at Q ms after the end of the CORESET and/or SS, or the cancellation start at the beginning of the channel/signal triggered or scheduled by the PDCCH transmitted in the CORESET/SS. Q is a positive number. When the CORESET/SS occasion overlaps with the uplink channel/signal, the cancellation starts at the beginning at the CORESET/SS occasion.

In various embodiment in the present disclosure, "cancellation" may also mean dropping the transmission or reception in original time/frequency. The transmission or reception can be changed to other time/frequency resources. In various embodiments in the present disclosure, a cell may be generalized as frequency and/or time resource.

The present disclosure describes methods, apparatus, and computer-readable medium for wireless communication. The present disclosure addressed the issues with resolving/handling directional conflicts in a sub-band full duplex (SBFD) telecommunication system. The methods, devices, and computer-readable medium described in the present disclosure may facilitate the performance of wireless communication by resolving directional conflicts in the SBFD telecommunication system, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:

obtaining, by a user equipment (UE), a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the UE and a base station in opposite directions;

determining, by the UE, whether to cancel at least a portion of the first communication occasion or to cancel at least a portion of the second communication occasion based on first information of the first communication occasion and second information of the second communication occasion;

in response to determining to cancel at least the portion of the second communication occasion, canceling, by the UE, at least the portion of the second communication occasion and performing the first communication occasion; and in response to determining to cancel at least the portion of the first communication occasion, canceling, by the UE, at least the portion of the first communication occasion and performing the second communication occasion, wherein the first communication occasion and the second communication occasion share a same configuration-type comprising a first configuration-type indicating a semi-statically configured communication occasion or a second configuration-type indicating a dynamically scheduled communication occasion.

2. The method according to claim 1, wherein:

the first communication occasion is configured in a first cell and the second communication occasion is configured in a second cell; or the first communication occasion is configured in a first frequency resource and the second communication occasion is configured in a second frequency resource.

3. The method according to claim 1, wherein:

the first information of the first communication occasion comprises at least one of the following:

configuration-type information indicating whether the first communication occasion is the first configuration-type or the second configuration-type, priority-level information indicating a priority level of the first communication occasion, communication-direction information indicating whether the first communication occasion is a downlink occasion or an uplink occasion, an uplink cancellation indication indicating to cancel the first communication occasion when the first communication occasion is the uplink occasion, or a downlink preemption indication or a downlink deactivation indication indicating to cancel the first communication occasion when the first communication occasion is the downlink occasion; and the second information of the second communication occasion comprises at least one of the following:

configuration-type information indicating whether the second communication occasion is the first configuration-type or the second configuration-type, priority-level information indicating a priority level of the second communication occasion, communication-direction information indicating whether the second communication occasion is a downlink occasion or an uplink occasion, an uplink cancellation indication indicating to cancel the second communication occasion when the second communication occasion is the uplink occasion, or a downlink preemption indication or a downlink deactivation indication indicating to cancel the second communication occasion when the second communication occasion is the downlink occasion.

4. The method according to claim 1, wherein:

the first communication occasion is the second configuration-type and a downlink occasion;

the second communication occasion is the second configuration-type and an uplink occasion;

the first communication occasion has a higher priority than the second communication occasion; and the UE determines to cancel one of the following:

the second communication occasion in its entirety, or at least the portion of the second communication occasion that overlaps with the first communication occasion in the time domain.

5. The method according to claim 1, wherein:

the first communication occasion is the second configuration-type and an uplink occasion;

the second communication occasion is the second configuration-type and a downlink occasion;

the first communication occasion has a higher priority than the second communication occasion; and the UE determines to cancel one of the following:

the second communication occasion in its entirety, or at least the portion of the second communication occasion that overlaps with the first communication occasion in the time domain.

6. The method according to claim 1, wherein:

the first communication occasion is the first configuration-type and a downlink occasion;

the second communication occasion is the first configuration-type and an uplink occasion;

the first communication occasion has a higher priority than the second communication occasion; and the UE determines to cancel or postpone the second communication occasion.

7. The method according to claim 1, wherein:

the first communication occasion is the first configuration-type and an uplink occasion;

the second communication occasion is the first configuration-type and a downlink occasion;

the first communication occasion has a higher priority than the second communication occasion; and the UE determines to cancel or postpone the second communication occasion.

8. The method according to claim 1, wherein:

the first communication occasion is the first configuration-type;

the second communication occasion is the first configuration-type;

the first communication occasion has a same priority as the second communication occasion; and the UE determines, according to a cancellation rule, to cancel or postpone the second communication occasion.

9. An apparatus comprising:

a memory storing instructions; and a processor in communication with the memory, wherein, when the processor executes the instructions, the processor is configured to cause the apparatus to perform:

obtaining a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the apparatus and a base station in opposite directions;

determining whether to cancel at least a portion of the first communication occasion or to cancel at least a portion of the second communication occasion based on first information of the first communication occasion and second information of the second communication occasion;

in response to determining to cancel at least the portion of the second communication occasion, canceling at least the portion of the second communication occasion and performing the first communication occasion; and in response to determining to cancel at least the portion of the first communication occasion, canceling at least the portion of the first communication occasion and performing the second communication occasion, wherein the first communication occasion and the second communication occasion share a same configuration-type comprising a first configuration-type indicating a semi-statically configured communication occasion or a second configuration-type indicating a dynamically scheduled communication occasion.

10. The apparatus according to claim 9, wherein:

the first communication occasion is configured in a first cell and the second communication occasion is configured in a second cell; or the first communication occasion is configured in a first frequency resource and the second communication occasion is configured in a second frequency resource.

11. The apparatus according to claim 9, wherein:

the first information of the first communication occasion comprises at least one of the following:

configuration-type information indicating whether the first communication occasion is the first configuration-type or the second configuration-type, priority-level information indicating a priority level of the first communication occasion, communication-direction information indicating whether the first communication occasion is a downlink occasion or an uplink occasion, an uplink cancellation indication indicating to cancel the first communication occasion when the first communication occasion is the uplink occasion, or a downlink preemption indication or a downlink deactivation indication indicating to cancel the first communication occasion when the first communication occasion is the downlink occasion; and the second information of the second communication occasion comprises at least one of the following:

configuration-type information indicating whether the second communication occasion is the first configuration-type or the second configuration-type, priority-level information indicating a priority level of the second communication occasion, communication-direction information indicating whether the second communication occasion is a downlink occasion or an uplink occasion, an uplink cancellation indication indicating to cancel the second communication occasion when the second communication occasion is the uplink occasion, or a downlink preemption indication or a downlink deactivation indication indicating to cancel the second communication occasion when the second communication occasion is the downlink occasion.

12. A non-transitory computer program product comprising a computer-readable program medium storing instructions, wherein, the instructions, when executed by a processor in a device, are configured to cause the processor to perform:

obtaining a first communication occasion and a second communication occasion configured or scheduled to overlap in a time domain or with a gap in the time domain between the first communication occasion and the second communication occasion less than a threshold, wherein the first communication occasion and the second communication occasion are configured to communicate between the device and a base station in opposite directions;

determining whether to cancel at least a portion of the first communication occasion or to cancel at least a portion of the second communication occasion based on first information of the first communication occasion and second information of the second communication occasion;

in response to determining to cancel at least the portion of the second communication occasion, canceling at least the portion of the second communication occasion and performing the first communication occasion; and in response to determining to cancel at least the portion of the first communication occasion, canceling at least the portion of the first communication occasion and performing the second communication occasion, wherein the first communication occasion and the second communication occasion share a same configuration-type comprising a first configuration-type indicating a semi-statically configured communication occasion or a second configuration-type indicating a dynamically scheduled communication occasion.

13. The non-transitory computer program product according to claim 12, wherein:

the first communication occasion is configured in a first cell and the second communication occasion is configured in a second cell; or the first communication occasion is configured in a first frequency resource and the second communication occasion is configured in a second frequency resource.

* * * * *